US012467020B2

(12) United States Patent
Stolte et al.

(10) Patent No.: US 12,467,020 B2
(45) **Date of Patent: *Nov. 11, 2025**

(54) PRESSED, SELF-SOLIDIFYING, SOLID CLEANING COMPOSITIONS AND METHODS OF MAKING THEM

(71) Applicant: ECOLAB USA INC., Saint Paul, MN (US)

(72) Inventors: Roger L. Stolte, Saint Paul, MN (US); Michael Peter Dziuk, Saint Paul, MN (US); Melissa C. Meinke, Saint Paul, MN (US); Matthew C. Porter, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/443,493

(22) Filed: Jul. 27, 2021

(65) Prior Publication Data

US 2021/0355416 A1 Nov. 18, 2021

Related U.S. Application Data

(63) Continuation of application No. 15/604,805, filed on May 25, 2017, now Pat. No. 11,104,869, which is a (Continued)

(51) Int. Cl.

*C11D 3/10* (2006.01)
*B28B 1/04* (2006.01)

(Continued)

(52) U.S. Cl.

CPC ................ *C11D 13/16* (2013.01); *B28B 1/04* (2013.01); *B28B 1/087* (2013.01); *B28B 3/02* (2013.01);

(Continued)

(58) Field of Classification Search

CPC .... C11D 1/14; C11D 1/29; C11D 1/75; C11D 1/90; C11D 1/94; C11D 3/10; C11D 3/33;

(Continued)

(56) References Cited

U.S. PATENT DOCUMENTS

| | | | |
|---|---|---|---|
| RE18,626 | E | 10/1932 | White |
| 3,048,548 | A | 8/1962 | Martin et al. |

(Continued)

FOREIGN PATENT DOCUMENTS

| | | | |
|---|---|---|---|
| AU | 199646218 B2 | 9/1996 | |
| DE | 4121307 A1 | 1/1993 | |

(Continued)

OTHER PUBLICATIONS

European Patent Office, "Extended European Search Report", issued in connection to International Application No. 161584016, dated May 12, 2016, 9 pages. May 20, 2016.

(Continued)

*Primary Examiner* — Gregory R Delcotto

(74) *Attorney, Agent, or Firm* — McKee, Voorhees & Sease, PLC

(57) ABSTRACT

The present invention relates to a method of making a solid cleaning composition. The method can include pressing and/or vibrating a flowable solid of a self-solidifying cleaning composition. For a self-solidifying cleaning composition, pressing and/or vibrating a flowable solid determines the shape and density of the solid but is not required for forming a solid. The method can employ a concrete block machine for pressing and/or vibrating. The present invention also relates to a solid cleaning composition made by the method and to solid cleaning compositions including particles bound together by a binding agent.

11 Claims, 4 Drawing Sheets

Related U.S. Application Data continuation of application No. 14/517,997, filed on Oct. 20, 2014, now Pat. No. 9,862,915, which is a continuation of application No. 12/288,355, filed on Oct. 17, 2008, now Pat. No. 8,894,897.

(60) Provisional application No. 60/980,912, filed on Oct. 18, 2007.

(51) Int. Cl.

| | |
|---|---|
| ***B28B 1/087*** | (2006.01) |
| ***B28B 3/02*** | (2006.01) |
| ***C11D 1/00*** | (2006.01) |
| ***C11D 1/14*** | (2006.01) |
| ***C11D 1/29*** | (2006.01) |
| ***C11D 1/75*** | (2006.01) |
| ***C11D 1/90*** | (2006.01) |
| ***C11D 1/94*** | (2006.01) |
| ***C11D 3/00*** | (2006.01) |
| ***C11D 3/04*** | (2006.01) |
| ***C11D 3/08*** | (2006.01) |
| ***C11D 3/20*** | (2006.01) |
| ***C11D 3/33*** | (2006.01) |
| ***C11D 3/37*** | (2006.01) |
| ***C11D 7/12*** | (2006.01) |
| ***C11D 7/32*** | (2006.01) |
| ***C11D 13/16*** | (2006.01) |
| ***C11D 13/18*** | (2006.01) |
| ***C11D 17/00*** | (2006.01) |

(52) U.S. Cl.

CPC .................. *C11D 1/00* (2013.01); *C11D 1/14* (2013.01); *C11D 1/29* (2013.01); *C11D 1/75* (2013.01); *C11D 1/90* (2013.01); *C11D 1/94* (2013.01); *C11D 3/0073* (2013.01); *C11D 3/044* (2013.01); *C11D 3/08* (2013.01); *C11D 3/10* (2013.01); *C11D 3/2086* (2013.01); *C11D 3/33* (2013.01); *C11D 3/3757* (2013.01); *C11D 3/3761* (2013.01); *C11D 3/3765* (2013.01); *C11D 3/378* (2013.01); *C11D 13/18* (2013.01); *C11D 17/0047* (2013.01); *C11D 17/0056* (2013.01); *C11D 17/0065* (2013.01); *C11D 17/0069* (2013.01); *C11D 17/0073* (2013.01); *C11D 17/0086* (2013.01); *C11D 17/0091* (2013.01)

(58) Field of Classification Search

CPC . C11D 3/3761; C11D 17/0056; C11D 17/073; C11D 17/0086; C11D 17/0091

USPC ....... 510/220, 229, 230, 426, 427, 433, 445, 510/446, 477, 499, 503, 509

See application file for complete search history.

(56) References Cited

U.S. PATENT DOCUMENTS

| | | | | |
|---|---|---|---|---|
| 3,334,147 | A | 8/1967 | Brunelle et al. | |
| 3,444,242 | A | 5/1969 | Rue | |
| 3,562,165 | A | 2/1971 | Renato | |
| 3,590,001 | A | 6/1971 | Taylor et al. | |
| 3,698,843 | A | 10/1972 | Bowles et al. | |
| 3,741,911 | A | 6/1973 | Shane et al. | |
| 4,013,577 | A | 3/1977 | Wixon | |
| 4,158,537 | A | 6/1979 | Cuff et al. | |
| 4,595,520 | A | 6/1986 | Heile et al. | |
| 4,618,914 | A | 10/1986 | Sato et al. | |
| 4,680,134 | A | 7/1987 | Heile et al. | |
| 4,689,167 | A | 8/1987 | Collins et al. | |
| 4,704,233 | A | 11/1987 | Hartman et al. | |
| 4,711,725 | A | 12/1987 | Amick et al. | |
| RE32,763 | E | 10/1988 | Fernholtz et al. | |
| RE32,818 | E | 1/1989 | Fernholtz et al. | |
| 4,802,836 | A | 2/1989 | Whissell | |
| 4,820,440 | A | 4/1989 | Hemm | |
| 4,830,773 | A | 5/1989 | Olson | |
| 4,906,397 | A | 3/1990 | Leighton et al. | |
| 4,971,714 | A | 11/1990 | Lokkesmoe et al. | |
| 5,009,804 | A | 4/1991 | Clayton et al. | |
| 5,061,396 | A | 10/1991 | Lovine et al. | |
| 5,152,910 | A | 10/1992 | Savio et al. | |
| 5,256,327 | A | 10/1993 | Allen et al. | |
| 5,292,446 | A | 3/1994 | Painter et al. | |
| 5,340,501 | A | 8/1994 | Steindorf | |
| 5,358,655 | A | 10/1994 | Kruse et al. | |
| 5,366,706 | A | 11/1994 | Perry, Jr. et al. | |
| 5,397,506 | A | 3/1995 | Groth et al. | |
| 5,407,594 | A | 4/1995 | Fry et al. | |
| 5,420,211 | A | 5/1995 | Hughes et al. | |
| 5,425,895 | A | 6/1995 | Backes et al. | |
| 5,482,647 | A | 1/1996 | Bolkan et al. | |
| 5,545,348 | A | 8/1996 | Savio | |
| 5,552,556 | A | 9/1996 | Miracle et al. | |
| 5,578,559 | A | 11/1996 | Dolan et al. | |
| 5,593,707 | A | 1/1997 | Goe et al. | |
| 5,646,103 | A | 7/1997 | Kottwitz et al. | |
| 5,719,111 | A | 2/1998 | van den Brom et al. | |
| 5,759,976 | A | 6/1998 | Roach et al. | |
| 5,759,977 | A | 6/1998 | van den Brom | |
| 5,786,313 | A | 7/1998 | Schneider et al. | |
| 5,798,326 | A | 8/1998 | Goldstein et al. | |
| 5,866,012 | A | 2/1999 | Austin et al. | |
| 5,922,661 | A | 7/1999 | Duccini et al. | |
| 5,925,610 | A | 7/1999 | Austin et al. | |
| 5,939,373 | A | 8/1999 | Haeggberg | |
| 6,013,613 | A | 1/2000 | Scheper | |
| 6,020,297 | A | 2/2000 | Austin et al. | |
| 6,025,322 | A | 2/2000 | Boeckh et al. | |
| 6,057,281 | A | 5/2000 | Stamm | |
| 6,075,093 | A | 6/2000 | Rodrigues | |
| 6,113,655 | A | 9/2000 | Tsunetsugu et al. | |
| 6,147,045 | A | 11/2000 | Lappas | |
| 6,150,324 | A | 11/2000 | Lentsch et al. | |
| 6,156,715 | A | 12/2000 | Lentsch et al. | |
| 6,159,922 | A | 12/2000 | Williams | |
| 6,172,020 | B1 | 1/2001 | Binstock et al. | |
| 6,176,920 | B1 | 1/2001 | Murphy et al. | |
| 6,194,368 | B1 | 2/2001 | Waschenbach et al. | |
| 6,258,765 | B1 | 7/2001 | Wei et al. | |
| 6,262,010 | B1 | 7/2001 | Emery et al. | |
| 6,262,011 | B1 | 7/2001 | Boeckh et al. | |
| 6,270,783 | B1 | 8/2001 | Slavtcheff | |
| 6,306,814 | B1 | 10/2001 | Appel | |
| 6,329,335 | B1 | 12/2001 | Feist | |
| 6,329,484 | B1 | 12/2001 | Losasso | |
| 6,369,011 | B1 | 4/2002 | Rai | |
| 6,410,495 | B1 | 6/2002 | Lentsch et al. | |
| 6,486,116 | B1 | 11/2002 | Hinton | |
| 6,503,879 | B2 | 1/2003 | Lentsch et al. | |
| RE38,262 | E | 10/2003 | Rolando et al. | |
| 6,638,902 | B2 | 10/2003 | Tarara et al. | |
| 6,673,765 | B1 * | 1/2004 | Schulz | C11D 3/128 510/447 |
| 6,777,383 | B1 | 8/2004 | Scepanski | |
| 6,812,200 | B2 | 11/2004 | Weber et al. | |
| 6,814,906 | B2 | 11/2004 | Bergeron et al. | |
| 6,956,019 | B2 | 10/2005 | Lentsch et al. | |
| 7,041,244 | B2 | 5/2006 | Schmiedel | |
| 7,094,746 | B2 * | 8/2006 | Lentsch | C11D 3/361 510/451 |
| 7,153,820 | B2 | 12/2006 | Olson et al. | |
| 7,186,677 | B2 | 3/2007 | Rahse et al. | |
| 7,341,987 | B2 | 3/2008 | Wei et al. | |
| 7,423,005 | B2 | 9/2008 | Stolte | |
| 7,893,012 | B2 | 2/2011 | Tjelta | |
| 8,093,200 | B2 | 1/2012 | Bartelme et al. | |
| 8,101,027 | B2 | 1/2012 | Vandermeulen | |
| 8,906,839 | B2 | 12/2014 | Lentsch et al. | |
| 11,603,510 | B2 * | 3/2023 | Emiru | C11D 1/94 |

(56) References Cited

U.S. PATENT DOCUMENTS

| | | | |
|---|---|---|---|
| 2002/0082178 A1 | 6/2002 | Besse et al. | |
| 2002/0177541 A1 | 11/2002 | Tarara et al. | |
| 2003/0040458 A1* | 2/2003 | Olson | C11D 17/0073 510/447 |
| 2003/0109403 A1 | 6/2003 | Man et al. | |
| 2004/0072715 A1 | 4/2004 | Griese et al. | |
| 2004/0157760 A1* | 8/2004 | Man | C11D 1/83 510/302 |
| 2004/0157761 A1 | 8/2004 | Man et al. | |
| 2005/0113278 A1 | 5/2005 | Stolte et al. | |
| 2005/0119149 A1 | 6/2005 | Lentsch et al. | |
| 2005/0202995 A1 | 9/2005 | Waits et al. | |
| 2005/0202996 A1 | 9/2005 | Waits et al. | |
| 2005/0222003 A1 | 10/2005 | Gagliardi et al. | |
| 2005/0233920 A1* | 10/2005 | Stolte | C11D 11/0082 510/147 |
| 2005/0261156 A1 | 11/2005 | Kottwitz et al. | |
| 2006/0199750 A1 | 9/2006 | Berger et al. | |
| 2006/0199754 A1 | 9/2006 | Brooker et al. | |
| 2006/0223734 A1 | 10/2006 | Bayersdoerfer et al. | |
| 2006/0247144 A1 | 11/2006 | Geret | |
| 2006/0281654 A1 | 12/2006 | Brooker et al. | |
| 2007/0015674 A1 | 1/2007 | Song et al. | |
| 2007/0053849 A1 | 3/2007 | Doyle et al. | |
| 2007/0105742 A1 | 5/2007 | Scheibel et al. | |
| 2007/0203047 A1 | 8/2007 | Pegelow et al. | |
| 2007/0253926 A1* | 11/2007 | Tadrowski | C11D 17/041 424/70.13 |
| 2008/0113893 A1* | 5/2008 | Rowland | C11D 17/0078 264/109 |
| 2008/0174041 A1 | 7/2008 | Firedman et al. | |
| 2012/0083437 A1* | 4/2012 | Choczaj | C11D 3/3707 510/356 |
| 2015/0329801 A1* | 11/2015 | Blattner | C11D 3/222 510/235 |
| 2018/0320110 A1 | 11/2018 | Dotzauer et al. | |
| 2018/0334640 A1 | 11/2018 | Bartelme et al. | |

FOREIGN PATENT DOCUMENTS

| | | | | |
|---|---|---|---|---|
| DE | 4128084 A1 | 2/1993 | | |
| EP | 0838519 | 4/1998 | | |
| EP | 0962521 A1 * | 12/1999 | C11D 1/04 | |
| EP | 200999264 A1 | 5/2000 | | |
| EP | 0812808 B1 | 8/2003 | | |
| JP | 6330020 A | 11/1994 | | |
| JP | 2000199178 | 7/2000 | | |
| JP | 2004204016 | 7/2004 | | |
| WO | 9300419 A1 | 1/1993 | | |
| WO | WO-9518212 A1 * | 7/1995 | C11D 1/652 | |
| WO | 9603490 A1 | 2/1996 | | |
| WO | 199603489 A1 | 2/1996 | | |
| WO | 199736974 A2 | 10/1997 | | |
| WO | 199830674 | 7/1998 | | |
| WO | 0022091 A1 | 4/2000 | | |
| WO | 2000052130 A1 | 9/2000 | | |
| WO | 2003016456 A1 | 2/2003 | | |
| WO | 2004027009 A1 | 4/2004 | | |
| WO | 2005075621 A1 | 8/2005 | | |
| WO | 2005105967 A1 | 11/2005 | | |
| WO | 2006029806 A1 | 3/2006 | | |
| WO | WO-2006121596 A1 * | 11/2006 | C11D 3/046 | |
| WO | 2007052004 A1 | 5/2007 | | |
| WO | 2008008063 A1 | 1/2008 | | |
| WO | WO-2008099289 A1 * | 8/2008 | C11D 1/04 | |
| WO | 2008137458 A2 | 11/2008 | | |
| WO | WO-2008137853 A1 * | 11/2008 | B28B 1/04 | |
| WO | 2009004512 A2 | 1/2009 | | |
| WO | 2009087541 A1 | 7/2009 | | |
| WO | WO-2012042424 A2 * | 4/2012 | C11D 1/72 | |

OTHER PUBLICATIONS

Rohm and Haas Company, "ACUMER® 3100 Terpolymer the Anti-Scale Deposition for "Stressed" Cooling Water Conditions", (7 pages) Dec. 31, 1999.

BASF, "Safety Data Sheet—Trilon* M Liquid", 7 pages, Version 1.0, 7 pages, Mar. 27, 2006.

BASF, "Trilon® M Marken" Technical Information catalogue, 14 pages Oct. 2006.

Rohm and Haas Company, "Acumer 2100 Copolymer", (4 pages) Dec. 12, 2002.

English Abstract of JP 2000199178 A., Applicant: Lion Corp (1 page) Jul. 18, 2000.

English Abstract of JP 2004204016 A., Applicant: Johnson Professional Co Ltd (1 page) Jul. 22, 2004.

Rohm and Haas Company, "ACUMER® 3100 Terpolymer for Control of Boiler Sludge", (12 pages) Dec. 31, 1999.

* cited by examiner

PRESSED, SELF-SOLIDIFYING, SOLID CLEANING COMPOSITIONS AND METHODS OF MAKING THEM

CROSS REFERENCE TO RELATED APPLICATIONS

This is a Continuation Application of U.S. Ser. No. 15/604,805, filed May 25, 2017, which is a continuation of U.S. Ser. No. 14/517,997, filed Oct. 20, 2014, now U.S. Pat. No. 9,862,915, issued Jan. 9, 2018, which is a continuation of U.S. Ser. No. 12/288,355, filed Oct. 17, 2008, now U.S. Pat. No. 8,894,897, issued Nov. 25, 2014, which claims priority under 35 U.S.C. § 119 to provisional application Ser. No. 60/980,912, filed Oct. 18, 2007, all of which are herein incorporated by reference in their entirety.

FIELD OF THE INVENTION

The present invention relates to a method of making a solid cleaning composition. The method can include pressing and/or vibrating a flowable solid of a self-solidifying cleaning composition. For a self-solidifying cleaning composition, pressing and/or vibrating a flowable solid determines the shape and density of the solid but is not required for forming a solid. The method can employ a concrete block machine for pressing and/or vibrating. The present invention also relates to a solid cleaning composition made by the method and to solid cleaning compositions including particles bound together by a binding agent.

BACKGROUND OF THE INVENTION

The use of solidification technology and solid block detergents in institutional and industrial operations was pioneered in the SOLID POWER® brand technology claimed in Fernholz et al., U.S. Reissue Pat. Nos. 32,762 and 32,818. This solidification technology and these solid cleaning compositions were followed by stable solid cleaning compositions including the proprietary E-Form binding agent, a mixture of hydrated sequestrant and hydrated carbonate.

Conventional solid block or tablet compositions can be made at high pressure in a tablet press, by casting a melted composition, and by extrusion. An expensive tablet press can apply its high pressures only to form tablet or puck sized solids. A tablet press is not suitable for making solid blocks. Casting requires melting the composition to form a liquid. Melting consumes energy and can destroy certain desirable ingredients in some cleaning products. Extruding requires expensive equipment and advanced technical know how.

There remains a need for additional methods for making solid cleaning compositions and for compositions that can be made by these methods.

SUMMARY OF THE INVENTION

The present invention relates to a method of making a solid cleaning composition. The method can include pressing and/or vibrating a flowable solid of a self-solidifying cleaning composition. For a self-solidifying cleaning composition, pressing and/or vibrating a flowable solid determines the shape and density of the solid but is not required for forming a solid. The method can employ a concrete block machine and/or a turntable press for pressing and/or vibrating. The present invention also relates to a solid cleaning composition made by the method and to solid self-solidifying cleaning compositions including particles bound together by a binding agent.

The present method relates to a method of making a solid cleaning composition. This method includes providing a flowable solid including water and alkalinity source, sequestrant, or mixture thereof. The method can include mixing the desired ingredients to form the flowable solid. The method also includes placing the flowable solid into a form. The method can include gently pressing the flowable solid in the form to produce the solid cleaning composition. The method can include vibrating the flowable solid in the form to produce the solid cleaning composition. The method can include both the gently pressing and the vibrating.

Gently pressing, vibrating, or a combination thereof can be done by a concrete block machine, also known as a concrete products machine or masonry product machine, or by a turntable press. The method of making a solid cleaning composition can include providing a flowable solid including water and alkalinity source, sequestrant, or mixture thereof. This embodiment of the method includes putting the flowable solid in a hopper or a drawer of a concrete block machine and operating the concrete block machine to produce a stable solid cleaning composition. Curing the stable solid composition can increase the rigidity, e.g., the hardness, of the solid. In an embodiment, the method includes putting the flowable solid in a drawer of a concrete block machine and vibrating the flowable solid in the drawer. The method also includes transferring the flowable solid from the drawer into a form. Once in the form, the method includes gently pressing the flowable solid in the form to produce the stable solid cleaning composition, vibrating the flowable solid to produce the stable solid cleaning composition, or combination thereof. The method then includes removing the stable solid cleaning composition from the form. The stable solid can optionally be cured to increase or enhance the rigidity of the solid.

The gently pressing, the vibrating, or the combination thereof can produce an uncured composition, the uncured composition including the flowable solid compressed to provide sufficient surface contact between particles making up the flowable solid that the uncured composition will solidify into a stable solid cleaning composition. Gently pressing can include applying pressures of about 1 to about 1000 psi to the flowable solid. In an embodiment, gently pressing can include applying pressures of about 1000 to about 2000 psi to the flowable solid. Vibrating can occur at about 3000 to about 6000 rpm. Vibrating can occur at about 1500 to about 3000 rpm. Vibrating can occur for about 1 to about 10 sec.

The present invention also relates to a solid cleaning composition. The solid cleaning composition can include hydrated alkalinity source, hydrated sequestrant, or mixture thereof. The solid cleaning composition can include particles of cleaning composition including an interior and a surface. The surface can include a binding agent. In the solid cleaning composition, the surfaces of adjacent particles can contact one another to provide sufficient contact of binding agent on the adjacent particles to provide a stable solid cleaning composition. The solid cleaning composition can be made by the method of the present invention.

DETAILED DESCRIPTION OF THE INVENTION

Definitions

Figure 1:
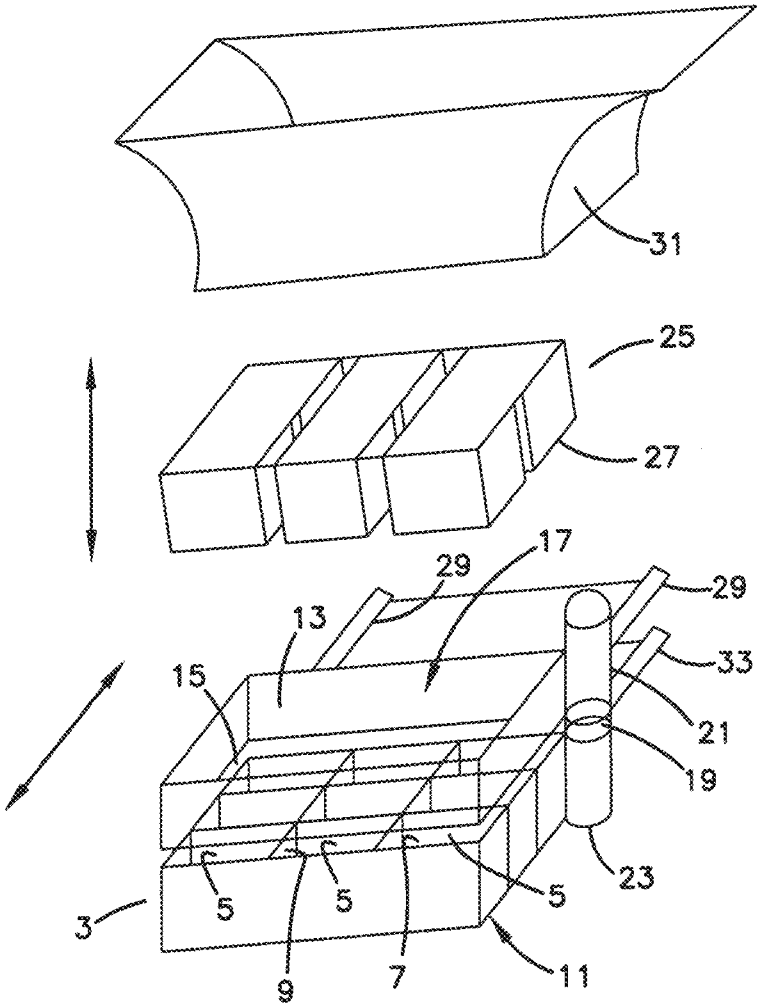
FIG. 1 schematically illustrates an apparatus suitable for gently pressing the present compositions, a concrete block machine.

As used herein, the phrase "concrete block machine" refers to a machine that forms concrete products (e.g., blocks or pavers) from concrete and that includes apparatus for pressing, vibrating, or combination thereof concrete (or the present flowable solid) in a form or mold. Such a machine is known in the product literature as a concrete product machine, concrete block machine, a masonry product machine, and the like.

Unless stated otherwise, as used herein, the term "psi" or "pounds per square inch" refers to the actual pressure applied to the material (e.g., the present flowable solid) being pressed (e.g., gently pressed) or applied to the material in a plurality of forms. As used herein, psi or pounds per square inch does not refer to the gauge or hydraulic pressure measured at a point in the apparatus doing the pressing. Gauge or hydraulic pressure measured at a point in an apparatus is referred to herein as "gauge pressure".

As used herein, the term "phosphate-free" refers to a composition, mixture, or ingredients that do not contain a phosphate or phosphate-containing compound or to which a phosphate or phosphate-containing compound has not been added. Should a phosphate or phosphate-containing compound be present through contamination of a phosphate-free composition, mixture, or ingredients, the level of phosphate shall be less than 0.5 wt %, may be less then 0.1 wt %, and can be less than 0.01 wt %.

As used herein, the term "phosphorus-free" refers to a composition, mixture, or ingredients that do not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the level of phosphorus shall be less than 0.5 wt %, may be less then 0.1 wt %, and can be less than 0.01 wt %.

The term "functional material" or "functional additives" refers to an active compound or material that affords desirable properties to the solid or dissolved composition. For example, the functional material can afford desirable properties to the solid composition such as enhancing solidification characteristics or dilution rate. The functional material can also, when dissolved or dispersed in an aqueous phase, provide a beneficial property to the aqueous material when used. Examples of functional materials include chelating/sequestering agent, alkalinity source, surfactant, cleaning agent, softening agent, buffer, anti-corrosion agent, bleach activators secondary hardening agent or solubility modifier, detergent filler, defoamer, anti-redeposition agent, antimicrobials, rinse aid compositions, a threshold agent or system, aesthetic enhancing agent (i.e., dye, perfume), lubricant compositions, additional bleaching agents, functional salts, hardening agents, solubility modifiers, enzymes, other such additives or functional ingredients, and the like, and mixtures thereof. Functional materials added to a composition will vary according to the type of composition being manufactured, and the intended end use of the composition.

As used herein, the term "binding agent" refers to a compound or composition added to the self-solidifying compositions to bind the composition together to aid formation of a solid. The present solids can employ any of a variety of suitable binding agents. For example, in some embodiments, the present solids include a carbonate hydrate binding agent such as E-Form. The present solids can include: a binding agent based on a hydrated chelating agent, such as a hydrated aminocarboxylate (e.g., HEDTA, EDTA, MGDA, or the like) together with a carbonate hydrate; a binding agent based on a hydrated carboxylate, such as a hydrated citrate salt or a hydrated tartrate salt; and a binding agent based on a hydrated polycarboxylate or hydrated anionic polymer. Another suitable binding agent is hydrated sodium hydroxide (i.e., caustic). Conventional caustic compositions are provided in a plastic jar or capsule. In contrast, an embodiment of a solid block of a caustic composition made according to the present method can be provided as a dimensionally stable solid block without a jar or capsule.

As used herein, the terms "chelating agent" and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. In general, chelating/sequestering agents can be referred to as a type of builder.

"Cleaning" means to perform or aid in soil removal, bleaching, microbial population reduction, or combination thereof.

As used herein, a "solid cleaning composition" refers to a cleaning composition in the form of a solid for example, as a powder, a flake, a granule, a pellet, a tablet, a lozenge, a puck, a briquette, a brick, a solid block, or a unit dose. The term "solid" refers to the state of the detergent composition under the expected conditions of storage and use of the solid detergent composition. In general, it is expected that the detergent composition will remain in solid form when exposed to temperatures of up to about 100° F. and greater than about 120° F.

As used herein, weight percent (wt-%), percent by weight, % by weight, and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Solid Self Solidifying Compositions

In some aspects, the present invention relates to solid self-solidifying compositions, e.g., cleaning compositions, and methods of making them. The present method can include pressing, vibrating, or a combination thereof (pressing and/or vibrating) a flowable solid of a self-solidifying cleaning composition to produce a solid, such as a block or puck. As used herein, the term "self-solidifying" refers to a composition that forms a solid without the need for pressure or vibration to be applied to the composition. For example, in some embodiments, a flowable solid of a self-solidifying composition forms a crumbly (friable) solid if just placed in a form or mold. Gently pressing, vibrating, or a combination thereof, the flowable solid in a mold or form produces a stable solid.

In other embodiments, a self-solidifying composition forms a crumbly solid if just placed in a form or mold. The composition can form a stable solid if allowed to cure in the mold for a period of time, e.g., an hour, a day, a week.

A "stable solid" composition refers to a solid that retains its shape under conditions in which the composition may be stored or handled. For a self-solidifying composition, pressing and/or vibrating a flowable solid determines the shape and density of the stable solid, but is not required for forming a solid.

In some embodiments, the self-solidifying compositions are cured. In some embodiments, the self-solidifying compositions are cured after they have been pressed and/or vibrated. In other embodiments, the self-solidifying compositions are cured after they have been placed in a form or mold. Curing the compositions results in an increase in the rigidity of the solid.

The amount of time the compositions are cured depends on a variety of factors, including, but not limited to, the desired rigidity of the solid composition, the ingredients present in the solid, and the desired end use of the solid. In some embodiments, the compositions are cured for at least about 30 minutes, at least about 1 hour, at least about 1 day, or at least about 1 week. In other embodiments, the compositions are cured for about 15 to about 30 minutes. The compositions are cured at ambient temperature. That is, the compositions do not require heating or cooling during the cure step.

Any of a variety of flowable self-solidifying solids can be used in the methods of the present invention. For example, in some embodiments, the flowable solid has a consistency similar to wet sand. Such a flowable solid can be compressed in a person's hand, like forming a snowball. However, immediately after forming it, a forceful impact (dropping or throwing) would return a hand compacted ball of the flowable solid to powder and other smaller pieces. In some embodiments, a flowable solid contains a small enough amount of water such that compressing the powder at several hundred psi does not squeeze liquid water from the solid. In certain embodiments, the present flowable self-solidifying solid can be a powder or a wetted powder.

The solid self-solidifying compositions include a binding agent and water. In some embodiments, the binding agent includes an alkalinity source, chelating agent, or combination thereof. Mixing of alkalinity source, chelating agent, or combination thereof with water and other desired cleaning agents produces a flowable solid (e.g., a flowable powder). Placing the flowable solid into a form (e.g., a mold or container) and gently pressing and/or vibrating the powder produces a stable solid.

"Gently pressing" or "pressing" refers to compressing the flowable solid in the container that is effective to bring a sufficient quantity of particles (e.g., granules) of the flowable solid into contact with one another. In the present method, "vibrating" refers to moving or imparting vibrational energy to the flowable solid in the container that is effective to bring a sufficient quantity of particles (e.g., granules) of the flowable solid into contact with one another. In the present method, "pressing and vibrating" refers to moving or imparting vibrational energy to and compressing the flowable solid in the container that is effective to bring a sufficient quantity of particles (e.g., granules) of the flowable solid into contact with one another. Without wishing to be bound by any particular theory, it is thought that a sufficient quantity of particles (e.g. granules) in contact with one another provides binding of particles to one another effective for making a stable solid composition.

The present examples disclose a variety of self-solidifying compositions that can be made formed into a stable solid according to the method of the present invention.

The method of the present invention can produce a stable solid without the high pressure compression employed in conventional tableting. A conventional tableting press applies pressures of at least about 5000 psi and even about 30,000-100,000 psi or more to a solid to produce a tablet. In contrast, the present method employs pressures on the solid of only less than or equal to about 1000 psi, in an embodiment less than or equal to 2000 psi. In certain embodiments, the present method employs pressures of less than or equal to about 300 psi, less than or equal to about 200 psi, or less than or equal to about 100 psi. In certain embodiments, the present method can employ pressures as low as greater than or equal to about 1 psi, greater than or equal to about 2 psi, greater than or equal to about 5 psi, or greater than or equal to about 10 psi. The solids of the present invention are held together not by mere compression but by a binding agent produced in the flowable solid that is effective for producing a stable solid. The pressing, vibrating, or combination thereof determines the shape and density of the solids but is not required for formation of the solids.

The method of the present invention can produce a stable solid in any of a variety of sizes, including sizes larger than can be produced in a tableting press. A conventional tableting press can make only smaller solid products, for example, those smaller than a hockey puck (or smaller than about 600 g). The present method has been employed to produce a solid block weighing about 3 kg to about 6 kg, with a volume of, for example, 5 gal, or having dimensions of, for example, 6×6 inches or a paver-like slab 12 inches square. The present method employs a binding agent, not pressure, to provide a large stable solid.

The method of the present invention can produce a stable solid without employing a melt and solidification of the melt as in conventional casting. Forming a melt requires heating a composition to melt it. The heat can be applied externally or can be produced by a chemical exotherm (e.g., from mixing caustic (sodium hydroxide) and water). Heating a composition consumes energy. Handling a hot melt requires safety precautions and equipment. Further, solidification of a melt requires cooling the melt in a container to solidify the melt and form the cast solid. Cooling requires time and/or energy. In contrast, the present method can employ ambient temperature and humidity during solidification or curing of the present compositions. Caustic compositions made according to the present method produce only a slight temperature increase due to the exotherm. The solids of the present invention are held together not by solidification from a melt but by a binding agent produced in the flowable solid and that is effective for producing a stable solid.

The method of the present invention can produce a stable solid without extruding to compress the mixture through a die. Conventional processes for extruding a mixture through a die to produce a solid cleaning composition apply high pressures to a solid or paste to produce the extruded solid. In contrast, the present method employs pressures on the solid of less than or equal to about 1000 psi or even as little as 1 psi. The solids of the present invention are held together not by mere compression but by a binding agent produced in the flowable solid and that is effective for producing a stable solid.

Methods of Making the Solid Self-Solidifying Compositions

In some aspects, a concrete block machine or turntable press is used to gently press and/or vibrate the self-solidifying compositions.

In some embodiments, the present composition can be vibrated and gently pressed in an apparatus that can form a concrete block, concrete paver, terrazzo tile, concrete slab, concrete tile, kerbstone, large concrete block, or other shaped concrete product. One configuration of such an apparatus is known variously as a concrete block machine, a concrete product machine, a masonry product machine, or the like. Another configuration of such an apparatus is known variously as a hermetic press, tamping machine, brick press, turntable press, hydraulic press, or the like.

The method can include employing a concrete block machine to form the solid cleaning composition. This embodiment of the method can include providing the present flowable solid. The method can include providing or putting the flowable solid in a drawer of the machine. In some embodiments, the method can include vibrating the flowable solid in the drawer. The method can include transferring the flowable solid from the drawer into a form. Once in the form, the flowable solid can be subjected to gentle pressing, vibrating, or a combination of both in the form to produce the stable solid cleaning composition. The stable solid composition can then be removed from the form. Once out of the form the composition can be cured, if desired.

The concrete block machine can vibrate the composition in the mold or form at about 200 to about 6000 rpm, about 200 to about 300 rpm, about 2500 to about 3000 (e.g., 3100) rpm, about 1500 to about 3000 rpm, or about 3000 to about 6000 rpm.

The concrete block machine can vibrate the composition in the mold for about 1 to about 10 sec or about 1 to about 6 sec.

The concrete block machine can press the content of the mold or form with a force of about 1 to about 1000 psi (or in an embodiment, to about 2000 psi), about 2 to about 300 psi, about 5 psi to about 200 psi, or about 10 psi to about 100 psi. In certain embodiments, the present method employs pressures of less than or equal to about 300 psi, less than or equal to about 200 psi, or less than or equal to about 100 psi. In certain embodiments, the present method can employ pressures as low as greater than or equal to about 1 psi, greater than or equal to about 2, greater than or equal to about 5 psi, or greater than or equal to about 10 psi.

The concrete block machine can vibrate the composition in the mold (and including the vibrating the form) at an excitation force (i.e., amplitude, centrifugal force) of, for example, about 2000 to about 6,500 lb, about 3000 to about 9000 lb, about 4000 to about 13,000 lb, or about 5000 to about 15,000 lb. In certain embodiments, the vibrational force can be about 2,000 lb, about 3,000 lb, about 4,000 lb, about 5,000 lb, about 6,000 lb, about 7,000 lb, about 8,000 lb, about 9,000 lb, about 10,000 lb, about 11,000 lb, about 12,000 lb, about 13,000 lb, about 14,000 lb, or about 15,000 lb.

In some embodiments, the method can include vibrating the drawer containing flowable solid for about 1 to about 10 sec at about 200 to about 6,000 rpm. In an embodiment, the method can include vibrating the form containing flowable solid for about 1 to about 10 sec at about 200 to about 6,000 rpm. In an embodiment, the method can include such vibrating and also include pressing on the flowable solid in the form with a weight of about 100 to about 2000 lb.

The method employing the concrete products machine can include any of a variety of additional manipulations useful for forming the solid cleaning composition. The method can include putting the flowable solid into a hopper. The method can include flowing or transporting the flowable solid from the hopper into the drawer. The flowable solid can flow from the hopper under the force of gravity into the drawer. If the hopper is positioned directly above the drawer, opening a portal on the bottom of the hopper can allow flowable solid to drop into the drawer. Alternatively, the hopper can be positioned above a ramp and the flowable solid can flow down the ramp and into the drawer.

The method can include vibrating and/or agitating the flowable solid in the hopper, as it flows or drops from the hopper into the drawer, in the drawer as it is flowing into the drawer, or once it is in the drawer.

The method includes transferring the flowable solid from the drawer into the form. Transferring the flowable solid from the drawer into the form can be accomplished by the force of gravity. For example, the drawer can be in a position (disposed) above the form. The bottom of the drawer can be configured to slide out or be moved laterally out from under the interior of the drawer. Thus, any flowable solid in the drawer will fall into the form, e.g., the cavity or cavities of the form. The method can include providing the drawer disposed above the form, the drawer including a panel disposed between an interior of the drawer and the form. The method can include laterally moving the panel to a position not between the interior of the drawer and the form. Accordingly, the flowable solid drops into the form.

The method can include vibrating the flowable solid in the form, as it flows or drops from the drawer into the form, in the form as it is flowing into the form, or once it is in the form. The method can include pressing the flowable solid in the form (e.g., in the cavity or cavities of the form).

The pressed and/or vibrated flowable solid (e.g., the uncured composition) can be removed from the form by any of a variety of methods. For example, removing the uncured composition from the form can include raising the form with the uncured composition remaining on a pallet that had formed the bottom of the form. The method can also include moving the pallet horizontally away from the drawer and form.

In short, the method can employ a drawer and form that are components of a concrete block machine. The concrete block machine can vibrate the flowable solid in the drawer; transfer the flowable solid from the drawer into a form, gently press the flowable solid in the form to produce the uncured solid cleaning composition, vibrate the flowable solid to produce the uncured solid cleaning composition, or combination thereof; and remove the uncured solid cleaning composition from the form (i.e., move the form off of the uncured composition).

In some embodiments, the method can be carried out with the apparatus known as a hermetic press, tamping machine, brick press, turntable press, hydraulic press, or the like. This embodiment of the method can be carried out as described above for the concrete block machine. This embodiment can also include the following variations from the use of the concrete block machine. This embodiment of the method can include providing the present flowable solid. The method can include providing or putting the flowable solid in a mold of the machine. Putting the flowable solid in the mold can be accomplished by an auger that feeds the solid into the mold. Putting the flowable solid in the mold can include vibrating the flowable solid in a drawer and transferring the flowable solid from the drawer into the mold. The mold can be subjected to negative pressure or suction to settle the flowable solid in the mold.

The method employing the turntable press can include any of a variety of additional manipulations useful for forming the solid cleaning composition. The method can include putting the flowable solid into a hopper. The method can include flowing or transporting the flowable solid from the hopper into the mold. The flowable solid can flow from the hopper (e.g., down a chute) under the force of gravity into the mold. The flowable solid can be moved from the hopper to the mold by an auger. The method can include vibrating and/or agitating the flowable solid in the hopper. The method can include vibrating the flowable solid in the mold, as it flows or drops into the mold, in the mold as it is flowing into the mold, or once it is in the mold. The method can include gently pressing the flowable solid in the mold (e.g., in the cavity or cavities of the form). Gently pressing can employ hydraulic pressure and a ram. The apparatus can be employed to apply a pressure of up to 2000 psi. In an embodiment, the apparatus can apply a maximum pressure of 1740 psi.

The pressed and/or vibrated flowable solid (e.g., the uncured composition) can be removed from the mold by any of a variety of methods. The uncured solid can be removed from the mold by lifting the mold and recovering the solid from a platform. The turntable can rotate to move another mold under the hydraulic ram.

In some embodiments, such an apparatus can provide the functions of a hermetic press, tamping, wet molding, and vibration.

Concrete Block Machine

Suitable concrete block machines include those manufactured by, for example, Columbia, Besser, Masa, Omag, or Quadra and having model numbers such as Columbia Model 15, 21, or 22; Besser SuperPac, BescoPac, or VibraPac; or Masa Extra-Large XL 6.0. These machines can produce, for example, 6-10 blocks of solid cleaning composition each weighing 1.5-3 kg in a single operation.

Referring now to FIG. 1, a concrete block machine 100 can include a drawer 1 configured to receive the flowable solid and to drop the flowable solid into a form 3. The form 3 can define one or a plurality of cavities 5 configured to provide the desired shape of the solid cleaning composition. For example, the form 3 can define cavity 5 with open top 7, form sides 9, and pallet 11.

Drawer 1 can include drawer sides 13 and bottom panel 15. Bottom panel 15 can be configured to be moved from beneath drawer sides 13. For example, bottom panel 15 can slideably engage drawer sides 13 so that bottom panel 15 be slid our from under drawer interior 17 defined by drawer sides 13. Concrete block machine 100 can be configured to position drawer 1 containing the present flowable solid (not shown) over form 3. Concrete block machine 100 can be configured to slide bottom panel 15 out from under drawer interior 17. When drawer 1 containing the present flowable solid is positioned over form 3 and bottom panel 15 is slid out from under drawer interior 17, the flowable solid drops into cavity or cavities 5.

Concrete block machine 100 can also include vibration system 19. Vibration system 19 can include drawer vibrator 21. Drawer vibrator 21 can be configured to vibrate drawer 1 and any flowable solid it contains. Drawer vibrator 21 can impart vibrational energy to the flowable solid in the drawer. Drawer vibrator 21 can be configured to vibrate drawer 1 and its contents at a preselected frequency (rpm) and a preselected amplitude (centrifugal force). Vibration system 19 can include form vibrator 23. Form vibrator 23 can be configured to vibrate form 3 and any flowable solid it contains. Form vibrator 23 can impart vibrational energy to the flowable solid in the form. Drawer vibrator 23 can be configured to vibrate form 3 and its contents at a preselected frequency (rpm) and a preselected amplitude (centrifugal force).

Concrete block machine 100 can also include pressing system 25. Pressing system 25 can be configured to press flowable solid in the cavity or cavities 5 of form 3. Pressing system can include, for example, a shoe or shoes 27 configured to be moved down onto flowable solid in cavity or cavities 5. Pressing system 25 can be configured to press upon the flowable solid in the cavity or cavities 5 of form 3 at a preselected pressure (psi).

Concrete block machine 100 can also include optional drawer transport 29 configured to move the drawer 1 with respect to the form 3. For example, drawer transport 29 can be configured to move drawer 1 from under a hopper 31 to over form 3. Alternatively, drawer 1 and hopper 31 can both be positioned over form 3. In such an embodiment, the drawer transport 29 may be absent of may be configured to move drawer 1 from over form 3, for example, for maintenance or other purposes. Hopper 31 can be configured to contain sufficient flowable solid for repeatedly filling the drawer 1 and the cavity or cavities 5.

Concrete block machine 100 can also include form transport 33 configured to move the form 3 with respect to the drawer 1. For example, form transport 33 can be configured to move form 3 from under drawer 1 to a position at the exterior of machine 100. For example, form transport 33 can be configured to raise form sides 9 while leaving uncured solid composition on pallet 11. Pallet 11 can then be moved to the exterior of the machine 100 so that the uncured solid composition can be removed from the machine.

Turntable Press

Suitable concrete block machines include those manufactured by, for example, Schauer & Haeberle, Masa, or the like and having model names such as Multi-System-Press 970, RECORD Power WP-06 4D, UNI-2000, WKP 1200 S, or the like. These machines can produce, for example, 6-10 blocks of solid cleaning composition each weighing 1.5-3 kg in a single operation.

Figure 2:
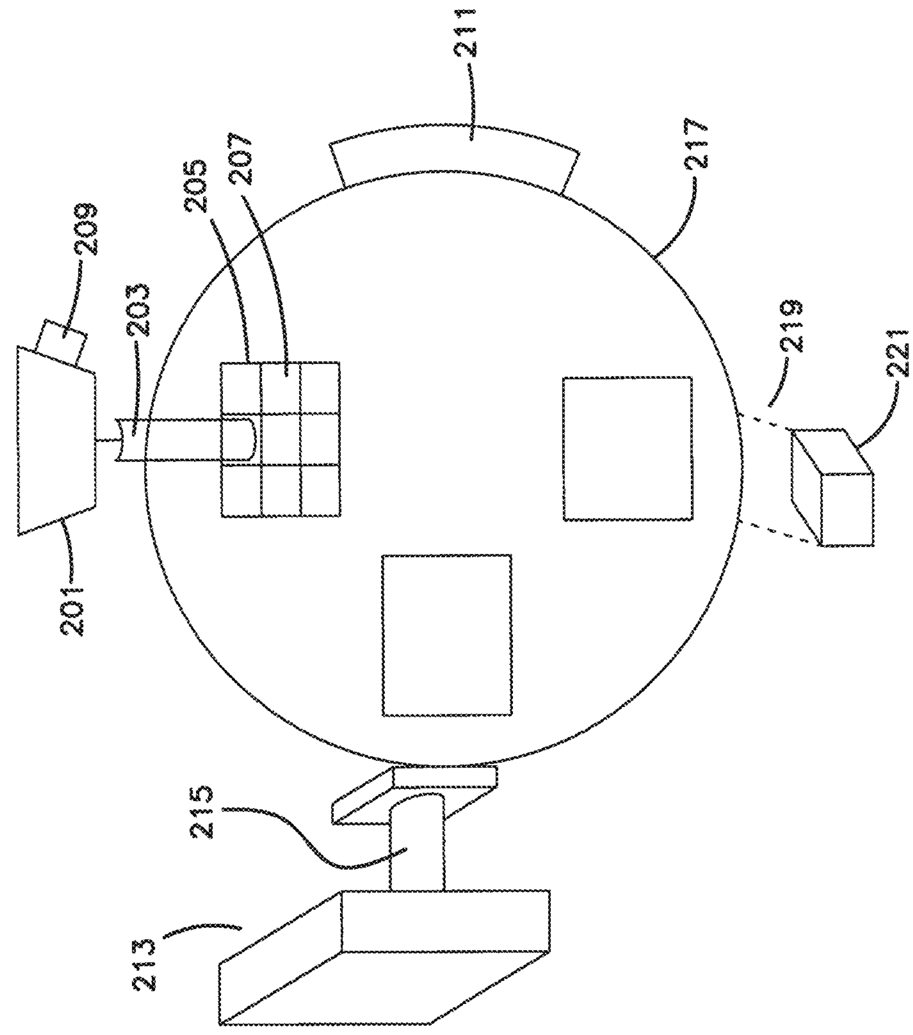
FIG. 2 schematically illustrates another apparatus suitable for gently pressing the present compositions, a turntable press.

Referring now to FIG. 2, a turntable press 200 can include a hopper 201 with chute 203 configured to receive the flowable solid and to drop the flowable solid into a mold 205. The mold 205 can define one or a plurality of chambers 207 configured to provide the desired shape of the solid cleaning composition. Turntable press 200 can include hopper vibrator 209 and/or mold vibrator 211 to vibrate the hopper and/or the mold, respectively, and any flowable solid that they might contain.

Turntable press 200 can impart vibrational energy to the flowable solid in the hopper 201. Hopper vibrator 209 can be configured to vibrate hopper 201 and its contents at a preselected frequency (rpm) and a preselected amplitude (centrifugal force). Mold vibrator 211 can impart vibrational energy to the flowable solid in the mold 205. Mold vibrator 211 can be configured to vibrate mold 205 and its contents at a preselected frequency (rpm) and a preselected amplitude (centrifugal force).

Turntable press 200 can also include press 213. Press 213 can be configured to press flowable solid in the mold 205 and any chamber or chambers 207 that might be in the mold 205. Press 213 can include, for example, a ram 215 configured to be moved down onto flowable solid in mold 205 and any chamber or chambers 207. Press 213 can be configured to press upon the flowable solid in the mold 205 and any chamber or chambers 207 at a preselected pressure (psi).

Turntable press 200 can also include turntable 217 configured to move the mold 205. For example, turntable 217 can be configured to move mold 205 from under chute 203 to a position under ram 215, and then, for example, to a unloading position 219, where the turntable pressed solid 221 can be removed from the apparatus.

In some aspects, the method of making a stable solid cleaning composition includes providing a self-solidifying composition comprising water and alkalinity source, sequestrant, or mixture thereof. The self-solidifying composition is transferred to a holding hopper. The holding hopper can include an agitation blade to prevent the self-solidifying composition from solidifying. The self-solidifying composition is then fed from the holding hopper into a run hopper. The run hopper can include an agitation blade to prevent the self-solidifying composition from solidifying. The self-solidifying composition is then transferred from the run hopper into a first cavity on a load cell. The self-solidifying composition is then transferred from the first cavity into a second cavity. The self-solidifying composition is then subjected to gentle pressing in the second cavity to produce the stable solid cleaning composition. The stable solid cleaning composition is then removed from the cavity.

Additional Methods for Pressing and/or Vibrating

The present solid composition can be made by an advantageous method of pressing and/or vibrating the solid composition. The method of pressing and/or vibrating the composition includes mixing the desired ingredients in the desired proportions, for example, with a ribbon or other known blender to form the flowable solid. In some embodiments, the method then includes forming the solid cleaning composition from the mixed ingredients by placing the flowable solid in a mold, pressing and/or vibrating the flowable solid in the mold to form a stable solid composition, and recovering the composition from the mold. The composition can be removed from the mold and then allowed to cure. Alternatively, the composition can be left in the mold and allowed to cure.

In some embodiments, the self-solidifying composition can be placed in a mold, and allowed to cure, in order to form a stable solid. That is, the composition can form a stable solid without the use of gentle pressing and/or vibrating. It is thought that, in certain embodiments, the weight of the composition alone will provide enough pressure to form a stable solid when the composition is held in a form or mold.

Pressing can employ low pressures compared to conventional pressures used to form tablets or other conventional solid cleaning compositions. For example, successful pressing and/or vibrating can be achieved by placing a board on the top of the mold and in contact with the flowable solid in the mold and tapping on the board (or other piece of wood, or a piece of metal or plastic) with a common claw hammer.

By way of further example, in an embodiment, the present method employs a pressure on the solid of only less than or equal to about 1000 psi. In certain embodiments, the present method employs pressures of less than or equal to about 300 psi, less than or equal to about 200 psi, or less than or equal to about 100 psi. In certain embodiments, the present method can employ pressures as low as greater than or equal to about 1 psi, greater than or equal to about 2, greater than or equal to about 5 psi, or greater than or equal to about 10 psi. In certain embodiments, the present method can employ pressures of about 1 to about 1000 psi, about 2 to about 300 psi, about 5 psi to about 200 psi, or about 10 psi to about 100 psi. In an embodiment, gently pressing can include applying pressures of about 1000 to about 2000 psi to the flowable solid. Gentle pressing can be accomplished by any of a variety of apparatus. Suitable apparatus for gentle pressing include a press with a lever, which can employ hydraulic cylinder or a screw press.

In some embodiments, the ingredients are packed in the mold by a method including vibrating. This embodiment includes forming the solid cleaning composition from the mixed ingredients by placing the flowable solid in a mold, vibrating the mold containing the flowable solid, vibrating the flowable solid in the mold, vibrating the flowable solid before or as it is put into the mold, or combination thereof to form the stable solid composition, and recovering the pressed and/or vibrated composition from the mold.

Vibrating can include any of a variety of methods for imparting vibrational energy to the mold of the mixed ingredients. For example, vibrating can include vibrating a plurality of molds containing the mixed ingredients on a platform. For example, vibrating can include inserting a vibrating probe into the mixed ingredients in the mold. For example, vibrating can include placing a vibrating surface or object onto the mixed ingredients in the mold.

Vibrating can also include vibrating the flowable solid before or as the flowable solid is placed in the mold. The flowable solid can be stored or provided as a quantity sufficient for producing hundreds or thousands of pounds of solid cleaning composition. For example, an amount of flowable solid sufficient to fill several molds or forms can be placed in a container (e.g., a drawer) and vibrated in the container. The flowable solid can be vibrated as it is moved (e.g., dropped) from the container into the mold or form.

Vibrating effective for forming the present solids includes vibrating at about 200 to about 6000 rpm, about 200 to about 300 rpm, about 2500 to about 3000 (e.g., 3100) rpm, about 1500 to about 3000 rpm, or about 3000 to about 6000 rpm.

Vibrating can be conducted for about 1 to about 10 sec or about 1 to about 6 sec. Suitable apparatus for vibrating the composition includes a concrete block machine or concrete products machine.

In certain embodiments, the vibration can be quantified as the amount of vibrational energy—centrifugal force—applied to the flowable solid, mold or form, and moving parts of the apparatus. In certain embodiments, the amount of vibrational force is about 100 lb, about 200 lb, about 300 lb, about 400 lb, about 500 lb, about 600 lb, about 700 lb, about 800 lb, about 900 lb, or about 1,000. In certain embodiments, the amount of vibrational force is about 2,000 lb, about 3,000 lb, about 4,000 lb, about 5,000 lb, about 6,000 lb, about 7,000 lb, about 8,000 lb, about 9,000 lb, about 10,000 lb, about 11,000 lb, about 12,000 lb, about 13,000 lb, about 14,000 lb, or about 15,000 lb. In certain embodiments, the amount of vibrational force is about 100 lb, about 200 lb, about 300 lb, about 400 lb, about 500 lb, about 600 lb, about 700 lb, about 800 lb, about 900 lb, about 1,000, about 1,500 lb, about 2,000 lb, about 3,000 lb, about 4,000 lb, about 5,000 lb, about 6,000 lb, about 7,000 lb, about 8,000 lb, about 9,000 lb, about 10,000 lb, about 11,000 lb, about 12,000 lb, about 13,000 lb, about 14,000 lb, or about 15,000 lb. Employing a concrete products machine, the amount of vibrational force applied to the flowable solid, mold or form, and moving parts of the machine can be about 2000 to about 6,500 lb, about 3000 to about 9000 lb, about 4000 to about 13,000 lb, or about 5000 to about 15,000 lb.

The mold can be coated with a release layer to ease release of the solid composition from the mold.

The method can operate on any of a variety of compositions. The composition can be, for example, a flowable powder or a paste. Suitable flowable powders include a powder and a wetted powder. The method can operate on a composition that can flow or be dropped into and fill the mold and that forms a suitable binding agent.

In certain embodiments, it is possible to make the present solid compositions by methods that do not employ gentle pressing, but that employ higher pressures, such as up to 2500 psi, up to 3000 psi, up to 3500 psi, up to 4000 psi, up to 4500 psi, or less than 5000 psi.

Compositions

In some aspects, the present invention provides solid self-solidifying cleaning compositions and methods for making and using them. The compositions include ingredients that function as binding agents, e.g., ingredients that aid in the solidification of the compositions.

Binding Agents

A solid cleaning composition can be maintained as a solid by a portion or component of the composition that acts as a binding agent. That is the compositions that form the binding agents provide the self-solidifying properties to the compositions. The binding agent can be dispersed throughout the solid cleaning composition to bind the detergent composition together to provide a solid cleaning composition. In some embodiments, the compositions do not include conventional table binders.

In some embodiments, the binding agent is inorganic and can be a source of alkalinity. Examples of such inorganic alkaline binding agents include sodium hydroxide, sodium carbonate or ash, sodium metasilicate, or a mixture thereof. The solid cleaning composition can include about 10 to about 80 wt-% binding agent or about 1 to about 40 wt-% binding agent, and sufficient water to provide hydration for solidification.

In some embodiments, the binding agent is formed by mixing alkali metal carbonate, alkali metal bicarbonate, and water. The alkali metal carbonate can be or include soda ash (i.e., sodium carbonate). The alkali metal bicarbonate can be or include sodium bicarbonate. The alkali metal bicarbonate component can be provided by adding alkali metal bicarbonate or by forming alkali metal bicarbonate in situ. The alkali metal bicarbonate can be formed in situ by reacting the alkali metal carbonate with an acid. The amounts of alkali metal carbonate, alkali metal bicarbonate, and water can be adjusted to control the rate of solidification of the detergent composition and to control the pH of aqueous detergent composition obtained from the solid cleaning composition. The rate of solidification of the detergent composition can be increased by increasing the ratio of alkali metal bicarbonate to alkali metal carbonate, or decreased by decreasing the ratio of alkali metal bicarbonate to alkali metal carbonate.

In certain embodiments, the solid cleaning composition contains about 10 to about 80 wt-% alkali metal carbonate or about 1 wt-% to about 40 wt-% alkali metal bicarbonate and sufficient water to provide at least a monohydrate of carbonate and a monohydrate of bicarbonate.

In other embodiments, binding agent includes alkaline carbonate, water, and a sequestering agent. For example, the composition can include an alkali metal salt of an organophosphonate at about 1 to about 30 wt-%, e.g., about 3 to about 15 wt-% of a potassium salt; water at about 5 to about 15 wt-%, e.g., about 5 to about 12 wt-%; and alkali metal carbonate at about 25 to about 80 wt-%, e.g., about 30 to about 55 wt-%. For example, the composition can include an alkali metal salt of an aminocarboxylate at about 1 to about 30 wt-%, e.g., about 3 to about 20 wt-% of a potassium salt; water at about 5 to about 15 wt-%, e.g., about 5 to about 12 wt-%; and alkali metal carbonate at about 25 to about 80 wt-%, e.g., about 30 to about 55 wt-%. A single E-form hydrate binder forms as this material solidifies. The solid detergent includes a major proportion of carbonate monohydrate, a portion of non-hydrated (substantially anhydrous) alkali metal carbonate and the E-form binder including a fraction of the carbonate material, an amount of the organophosphonate and water of hydration.

In some embodiments, the present invention relates to a solid composition including a binding agent (e.g. the E-form binding agent), a source of alkalinity in addition to the binding agent, and additional cleaning agents. The E-form binding agent includes sequestrant and source of alkalinity with advantageous stability. It is described in U.S. Patents including U.S. Pat. Nos. 6,177,392; 6,150,324, 6,156,715, 6,258,765; each of which is incorporated herein by reference for disclosure of the binding agent.

In an embodiment, the solid cleaning composition includes sodium carbonate ($Na_2CO_3$), sodium hydroxide (NaOH), sodium metasilicate, amino carboxylate, or a mixture thereof as a binding agent of the solid self-solidifying composition. The composition can include, for example, about 10 to 80 wt-% of sodium carbonate, sodium hydroxide, sodium metasilicate, aminocarboxylate, or a mixture thereof. The solid cleaning composition can also include an amount of an organic phosphonate sequestrant effective to aid solidification. The phosphonate can be a potassium salt. The solid cleaning composition can include about 10 to about 40 wt-% sodium carbonate or about 20 to about 40 wt-% sodium carbonate. In an embodiment, the solid cleaning composition can include about 20 to about 40 wt-% sodium carbonate and about 15 to about 40 wt-% sodium hydroxide.

In some embodiments, the solid cleaning composition includes a substantial portion of sodium hydroxide. The resulting solid can include a matrix of hydrated solid sodium hydroxide with the detergent ingredients in the hydrated matrix. In such a caustic solid, or in other hydrated solids, the hydrated chemicals are reacted with water and the hydration reaction can be run to substantial completion. The sodium hydroxide also provides substantial cleaning in warewashing systems and in other use loci that require rapid and complete soil removal. Certain embodiments contain at least about 30 wt-% of an alkali metal hydroxide in combination with water of hydration. For example, the composition can contain about 30 to about 50 wt-% of an alkali metal hydroxide.

The following patents disclose various combinations of solidification, binding and/or hardening agents that can be utilized in the solid cleaning compositions of the present invention. The following U.S. patents are incorporated herein by reference: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392;

6,156,715; 5,858,299; 5,316,688; 5,234,615; 5,198,198; 5,078,301; 4,595,520; 4,680,134; RE32,763; and RE32818.

In other embodiments, binding agent includes a sequestering agent and, optionally, carbonate. For example, the composition can include an alkali metal salt of an organophosphonate at about 1 to about 30 wt-%, e.g., about 3 to about 15 wt-% of a potassium salt.

In some embodiments, the composition can include an alkali metal salt of an aminocarboxylate at about 1 to about 30 wt-%, e.g., about 3 to about 20 wt-% of a potassium salt. In other embodiments, the composition can include an alkali metal salt of carboxylic acid at about 1 to about 30 wt-%, e.g., about 3 to about 20 wt-% of a potassium salt. Suitable carboxylic acid salts include citrate and other carboxylates with 2 or 3 carboxyl groups. In an embodiment, the carboxylate salt can be acetate. These compositions can also include, for example, water at about 5 to about 15 wt-%, e.g., about 5 to about 12 wt-%; and alkali metal carbonate at about 25 to about 80 wt-%, e.g., about 30 to about 55 wt-%.

The compositions can also include water, a carboxylic acid, and a mixture of polymers, e.g., polymaleic acid, and polyacrylic acids as a binding agent.

In other embodiments, the compositions can include methacrylate, sodium carbonate and water as a binding agent. A discussion of binding agents of this type can be found, for example, in U.S. patent application Ser. No. 11/800,286, which is hereby incorporated by reference.

In an embodiment, the binding agent is inorganic and can be a source of alkalinity. Additional examples of such inorganic alkaline binding agents include tripolyphosphate hexahydrate, orthosilicate (e.g., sodium orthosilicate), or mixture thereof. The solid cleaning composition can include about 10 to about 80 wt-% binding agent or about 1 to about 40 wt-% binding agent, and sufficient water to provide hydration for solidification.

The composition can include two binding agents, a primary binding agent and a secondary binding agent. The term "primary binding agent" refers to the binding agent that is the primary source for causing the solidification of the detergent composition. The term "secondary binding agent" refers to the binding agent that acts as an auxiliary binding agent in combination with another primary binding agent. The secondary binding agent can, for example, enhance or accelerate solidification of the composition.

Carboxylate/Sulfonate Co- and Ter-Polymer Containing Binding Agents

In some embodiments, the compositions of the present invention include a binding agent that includes a carboxylate/sulfonate co- or ter-polymer, alkalinity source (e.g., a carbonate salt), and water. Suitable carboxylate/sulfonate co- and ter-polymers include a carboxylate/sulfonate copolymer of molecular weight of about 11,000, such as copolymers of (meth)acrylate and 2-acrylamido-2-methyl propane sulfonic acid (AMPS) and a terpolymer including (meth)acrylate, AMPS and a vinyl ester, vinyl acetate or alkyl substituted acrylamide having a molecular weight of about 4,500 to about 5,500. In an embodiment, the detergent composition includes about 1 to about 15 wt-% carboxylate/sulfonate co- or ter-polymer, about 2 to about 50% water, less than about 40% builder, about 20 to about 70 wt-% alkalinity source (e.g., a carbonate salt), and about 0.5 to about 10 wt-% surfactant.

The binding agent can include a carboxylate/sulfonate co- or ter-polymer, alkalinity source (e.g., a carbonate salt, such as sodium carbonate (soda ash)), and water for forming solid compositions. Suitable component concentrations for the binding agent range include about 1 to about 15 wt-% of carboxylate/sulfonate co- or ter-polymer, about 2 to about 20 wt-% water, and about 20 to about 70 wt-% alkalinity source (e.g., a carbonate salt). Suitable component concentrations for the binding agent include about 2 to about 13 wt-% carboxylate/sulfonate co- or ter-polymer, about 2 to about 40 wt-% water, and about 25 to about 65 wt-% alkalinity source (e.g., a carbonate salt). Additional suitable component concentrations for the binding agent range from about 6 about 13 wt-% carboxylate/sulfonate co- or ter-polymer, about 2 to about 20 wt-% water, and about 45 to about 65 wt-% alkalinity source (e.g., a carbonate salt).

Examples of suitable polycarboxylic acid polymer include carboxylate/sulfonate co- and ter-polymers including (meth)acrylic acid units and acrylamido alkyl or aryl sulfonate units. The terpolymer can also include one or more units that is a vinyl ester, a vinyl acetate, or substituted acrylamide. Suitable copolymers include (meth)acrylic acid and AMPS in at about 50 wt-% each and with a molecular weight of about 11,000.

Suitable terpolymers can include about 10 to about 84 wt-% (meth)acrylic acid units, greater than 11 to about 40 wt-% acrylamido alkyl or aryl sulfonate units, and about 5 to about 50 wt-% of one or more units that is a vinyl ester, vinyl acetate, or substituted acrylamide and with an average molecular weight of about 3000 to about 25,000, about 4000 to about 8000, or, preferably, about 4,500 to about 5,500. Suitable (meth)acrylic acids and salts include acrylic acid, methacrylic acid and sodium salts thereof. Suitable vinyl dicarboxylic acids and anhydrides thereof, such as for example maleic acid, fumaric acid, itaconic acid and their anhydrides, may also be used in place of all, or part of, the (meth)acrylic acid and salt component. 2-acrylamido-2-methyl propane sulfonic acid (AMPS) is the preferred substituted acrylamido sulfonate. Hindered amines such as t-butyl acrylamide, t-octyl acrylamide and dimethylacrylamide are the preferred (alkyl) substituted acrylamides. Suitable vinyl esters include ethyl acrylate, hydroxy ethyl methacrylate hydroxy propyl acrylate and cellosolve acrylate. A suitable terpolymer contains about 57 wt-% (meth) acrylic acid or salt units, about 23 wt-% AMPS, and about 20 wt-% of a vinyl ester, vinyl acetate or alkyl substituted acrylamide, and an average molecular weight of about 4500 to about 5500. Suitable terpolymers are described in U.S. Pat. No. 4,711,725, the disclosure of which is hereby incorporated by reference.

A suitable commercially available carboxylate/sulfonate copolymer is Acumer 2100, available from Rohm & Haas LLC, Philadelphia, PA. A suitable commercially available carboxylate/sulfonate terpolymer is Acumer 3100, available from Rohm & Haas LLC, Philadelphia, PA.

Carboxylate Containing Binding Agents

In some embodiments, the compositions of the present invention include a binding agent that can include a straight chain saturated mono-, di-, and tri-carboxylic acid or salt thereof. In some embodiments, the binding agent includes a straight chain saturated carboxylic acid or salt thereof, alkalinity source (e.g., a carbonate salt), and water. The straight chain saturated carboxylic acid can be a mono-, di-, or tri-carboxylic acid or salt thereof.

The binding agent can include a straight chain saturated mono-, di-, or tri-carboxylic acid or salt thereof, sodium carbonate (soda ash), and water for forming solid compositions. Suitable component concentrations for the binding agent range from about 1% and about 15 wt-% of a saturated straight chain saturated mono-, di-, or tri-carboxylic acid or salt thereof, about 2% and about 20 wt-% water, and about 20% and about 70 wt-% sodium carbonate. Suitable component concentrations for the binding agent range from about 1% and about 12% of a salt of a saturated straight chain saturated mono-, di-, or tri-carboxylic acid or salt thereof, about 5% and about 40 wt-% water, and about 45% and about 65 wt-% sodium carbonate. Additional suitable component concentrations for the binding agent range from about 1% and about 10% of a salt of a saturated straight chain saturated mono-, di-, or tri-carboxylic acid or salt thereof, about 5% and about 20 wt-% water, and about 50% and about 60 wt-% sodium carbonate.

Examples of suitable straight chain saturated monocarboxylic acids include acetic acid and gluconic acid. Examples of suitable straight chain saturated dicarboxylic acids include: tartaric acid, malic acid, succinic acid, glutaric acid, and adipic acid, and salts thereof. An example of a suitable straight chain saturated tricarboxylic acid is citric acid or salts thereof.

In some embodiments, the solid detergent composition can include a straight chain saturated mono-, di-, or tricarboxylic acid or salt thereof, water, builder, alkalinity source (e.g., a carbonate salt), and surfactant. In some embodiments, the solid detergent composition includes about 1 to about 15 wt-% straight chain saturated mono-, di-, or tri-carboxylic acid or salt thereof or about 1 to about 10 wt-% straight chain saturated mono-, di-, or tri-carboxylic acid or salt thereof. In other embodiments, the solid detergent composition includes about 2 to about 20 wt-% water or about 5 to about 40 wt-% water. In still yet other embodiments, the solid detergent composition includes less than about 40 wt-% builder or less than about 30 wt-% builder. In some embodiments, the solid detergent composition includes about 20 to about 70% sodium carbonate or about 45 to about 65 wt-% sodium carbonate. In other embodiments, the solid detergent composition includes about 0.5 to about 10 wt-% surfactant or about 1 to about 5 wt-% surfactant.

Aminocarboxylate Containing Binding Agents

In some embodiments, a composition can include a binding agent that includes a biodegradable aminocarboxylate, alkalinity source (e.g., a carbonate salt), and water. The biodegradable aminocarboxylate, alkalinity source (e.g., a carbonate salt), and water interact to form a hydrate solid. Another embodiment of the present invention is a composition that includes a biodegradable aminocarboxylate, water, builder, alkalinity source (e.g., a carbonate salt), and a surfactant. The detergent composition can include about 2 to about 20% biodegradable aminocarboxylate, about 2 to about 20 wt-% water, less than about 40 wt-% builder, about 20 to about 70 wt-% alkalinity source (e.g., a carbonate salt), and about 0.5 to about 10 wt-% surfactant.

The binding agent can include an aminocarboxylate, alkalinity source (e.g., a carbonate salt, such as sodium carbonate (soda ash)), and water for forming solid compositions. Suitable component concentrations for the binding agent range from about 1 to about 20 wt-% of an aminocarboxylate, about 2 to about 20 wt-% water, and about 20 to about 70 wt-% alkalinity source (e.g., a carbonate salt). Suitable component concentrations for the binding agent include about 2 to about 18 wt-% aminocarboxylate, about 2 to about 40 wt-% water, and about 25 about 65 wt-% alkalinity source (e.g., a carbonate salt). Additional suitable component concentrations for the binding agent include about 3 about 16 wt-% aminocarboxylate, about 2 about 20 wt-% water, and about 45 about 65 wt-% alkalinity source (e.g., a carbonate salt).

Examples of suitable aminocarboxylates include biodegradable aminocarboxylates. Examples of suitable biodegradable aminocarboxylates include: ethanoldiglycine, e.g., an alkali metal salt of ethanoldiglycine, such at disodium ethanoldiglycine ($Na_2EDG$); methylgylcinediacetic acid, e.g., an alkali metal salt of methylgylcinediacetic acid, such as trisodium methylgylcinediacetic acid; iminodisuccinic acid, e.g., an alkali metal salt of iminodisuccinic acid, such as iminodisuccinic acid sodium salt; N,N-bis-(carboxylatomethyl)-L-glutamic acid (GLDA), e.g., an alkali metal salt of N,N-bis(carboxylatomethyl)-L-glutamic acid, such as iminodisuccinic acid sodium salt (GLDA-$Na_4$); [S—S]-ethylenediaminedisuccinic acid (EDDS), e.g., an alkali metal salt of [S—S]-ethylenediaminedisuccinic acid, such as a sodium salt of [S—S]-ethylenediaminedisuccinic acid; 3-hydroxy-2,2'-iminodisuccinic acid (HIDS), e.g., an alkali metal salt of 3-hydroxy-2,2'-iminodisuccinic acid, such as tetrasodium 3-hydroxy-2,2'-iminodisuccinate. Examples of suitable commercially available biodegradable aminocarboxylates include, but are not limited to: Versene HEIDA (52%), available from Dow Chemical, Midland, MI; Trilon M (40% MGDA), available from BASF Corporation, Charlotte, NC; IDS, available from Lanxess, Leverkusen, Germany; Dissolvine GL-38 (38%), available from Akzo Nobel, Tarrytown, NJ; Octaquest (37%), available from; and HIDS (50%), available from Innospec Performance Chemicals (Octel Performance Chemicals), Edison, NJ.

Polycarboxylate Containing Binding Agents

In some embodiments, a binding agent that includes a polycarboxylic acid polymer, alkalinity source (e.g., a carbonate salt), and water can be included in the compositions. Suitable polycarboxylic acid polymers include a polyacrylic acid polymer having a molecular weight of about 1,000 to about 100,000, a modified polyacrylic acid polymer having a molecular weight of about 1,000 to about 100,000, or a polymaleic acid polymer having a molecular weight of about 500 to about 5,000. In an embodiment, the detergent composition includes about 1 to about 15 wt-% polycarboxylic acid polymer, about 2 to about 50% water, less than about 40% builder, about 20 to about 70 wt-% alkalinity source (e.g., a carbonate salt), and about 0.5 to about 10 wt-% surfactant.

The binding agent can include a polycarboxylic acid polymer, alkalinity source (e.g., a carbonate salt, such as sodium carbonate (soda ash)), and water for forming solid compositions. Suitable component concentrations for the binding agent range include about 1 to about 15 wt-% of polycarboxylic acid polymer, about 2 to about 20 wt-% water, and about 20 to about 70 wt-% alkalinity source (e.g., a carbonate salt). Suitable component concentrations for the binding agent include about 2 to about 12 wt-% polycarboxylic acid polymer, about 2 to about 40 wt-% water, and about 25 to about 65 wt-% alkalinity source (e.g., a carbonate salt). Additional suitable component concentrations for the binding agent range from about 5 about 10 wt-% polycarboxylic acid polymer, about 2 to about 20 wt-% water, and about 45 to about 65 wt-% alkalinity source (e.g., a carbonate salt).

Examples of an suitable polycarboxylic acid polymer include: polyacrylic acid polymers, polyacrylic acid polymers modified by a fatty acid end group ("modified polyacrylic acid polymers"), and polymaleic acid polymers. Examples of suitable polyacrylic acid polymers and modified polyacrylic acid polymers include those having a molecular weight of about 1,000 to about 100,000. Examples of suitable polymaleic acid polymers include those having a molecular weight of about 500 to about 5,000. A suitable commercially available polyacrylic acid polymers is Acusol 445N, available from Rohm & Haas LLC, Philadelphia, PA. An example of suitable commercially available modified polyacrylic acid polymer is Alcosperse 325, available from Alco Chemical, Chattanooga, TN. Examples of suitable commercially available polymaleic acid polymers include: Belclene 200, available from Houghton Chemical Corporation, Boston, MA and Aquatreat AR-801, available from Alco Chemical, Chattanooga, TN.

Inulin Containing Binding Agents

The solid self-solidifying cleaning composition according to the present invention can include an effective amount of one or more binding agents which contain no phosphorus or aminocarboxylate-based compounds. A suitable binding agent includes inulin. Inulins are naturally-occurring oligosaccharides. Inulins are chlorine-compatible and biodegradable. A representative structure is presented below.

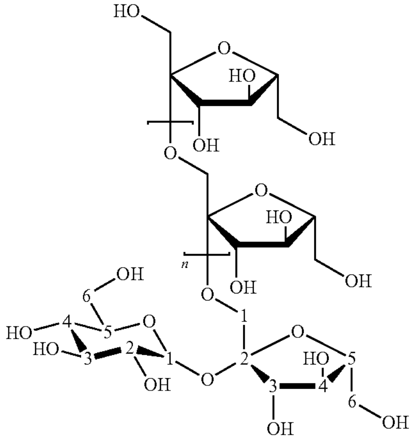

Inulins for use as binding agents include derivatized inulins. Derivatized inulins are modified to be further substituted at a varying number of the available hydroxyls, with alkyl, alkoxy, carboxy, and carboxy alkyl moieties, for example.

Typically, suitable inulin binding agents have molecular weights>1000. Often, suitable inulin binding agents have molecular weights>2000. An example of a suitable inulin binding agent is carboxymethyl inulin available from Solutia Inc. under the tradename DEQUEST. DEQUEST PB 11625 is a 20% solution of carboxymethyl inulin, sodium salt, having a MW>2000.

In general, an effective amount of inulin binding agents is considered an amount that enables solidification of the composition. An suitable effective amount of inulin binding agent is in a range of 5 to 15% by weight of the composition. The binding agent is initially provided into the composition in a hydrated form. Typically, the hydrated binding agent is prepared in an aqueous solution for use in the warewashing composition.

Without wishing to be bound by any particular theory, it is thought that in some embodiments, the solidification mechanism of the binding agent occurs through ash hydration, or the interaction of the sodium carbonate with water. The straight chain saturated mono-, di-, or tri-carboxylic acid salt, the aminocarboxylate, or the polycarboxylate can be considered a solidification modifier. The solidification modifier can control the kinetics and thermodynamics of the solidification process and provide a binding agent in which additional functional materials may be bound to form a functional solid composition. The solidification modifier may stabilize the carbonate hydrates and the functional solid composition by acting as a donor and/or acceptor of free water. By controlling the rate of water migration for hydration of the ash, the solidification modifier may control the rate of solidification to provide process and dimensional stability to the resulting product. The rate of solidification is significant because if the binding agent solidifies too quickly, the composition may solidify during mixing and stop processing. If the binding agent solidifies too slowly, valuable process time is lost.

The solidification modifier can also provide dimensional stability to the end product by ensuring that the solid product does not swell. If the solid product swells after solidification, various problems may occur, including but not limited to: decreased density, integrity, and appearance; and inability to dispense or package the solid product. A solid product is considered to have dimensional stability if the solid product has a growth exponent of less than about 3%, less than about 2%, and more less than about 1.5%.

The solidification modifier can be combined with water prior to incorporation into the solid composition and can be provided as a solid hydrate or as a solid salt that is solvated in an aqueous solution, e.g., in a liquid premix. In an embodiment, the solidification modifier is in a water matrix when added to the detergent composition for the detergent composition to effectively solidify. In general, an effective amount of solidification modifier considered an amount that effectively controls the kinetics and thermodynamics of the solidification system, which can occur through controlling the rate and movement of water.

The binding agent and resulting solid detergent composition may also exclude phosphorus or nitrilotriacetic acid (NTA) containing compounds, to make the solid detergent composition more environmentally acceptable. Phosphorus-free refers to a composition, mixture, or ingredients to which phosphorus-containing compounds are not added. Should phosphorus-containing compounds be present through contamination of a phosphorus-free composition, mixture, or ingredient, the level of phosphorus-containing compounds in the resulting composition is less than about 0.5 wt %, less than about 0.1 wt %, and often less than about 0.01 wt %. NTA-free refers to a composition, mixture, or ingredients to which NTA-containing compounds are not added. Should NTA-containing compounds be present through contamination of an NTA-free composition, mixture, or ingredient, the level of NTA in the resulting composition shall be less than about 0.5 wt %, less than about 0.1 wt %, and often less than about 0.01 wt %. When the binding agent is NTA-free, the binding agent and resulting solid detergent composition is also compatible with chlorine, which functions as an anti-redeposition and stain-removal agent.

E-Form Solids

In some aspects, an E-form binding agent can be part of a self-solidifying composition including organic sequestrant including a phosphonate, an aminocarboxylic acid, or mixtures thereof; a carbonate or other source of alkalinity; and water. At least a portion of the components of the mixture, including organic sequestrant, alkalinity source, and water, during solidification, complex to form at least a portion of a binding agent. As the mixture solidifies, the binding agent forms to bind and solidify the components of the mixture. The solidified mixture can optionally include additional functional materials, and the additional functional materials are bound within the solidified mixture by the formation of the binding agent.

Formation of the binder can increase the stability of the source of alkalinity and water. In certain embodiments, the stabilized source of alkalinity within the solidified mixture has a higher decomposition temperature than the source of alkalinity would have when it is not within the solidified mixture. In certain embodiments, the solidified composition has a melting transition temperature in the range of 120° C. to 160° C. However, other embodiments may have a melting transition temperature outside of this range.

Some embodiments of the cleaning composition include one or more sources of alkalinity. The source of alkalinity can be an alkali metal salt, which can enhance cleaning of a substrate or improve soil removal performance of the composition. Additionally, in some embodiments the alkali metal salts can provide for the formation of an additional binder complex or binding agent including: alkali metal salt; organic sequestrant including a phosphonate, an aminocarboxylic acid, or mixtures thereof; and water, e.g., E-Form hydrate. The binding agent can include the organic sequestrant and the source of alkalinity. For example, the binding agent can have a melting transition temperature in the range of about 120° C. to 160° C.

Some examples of alkali metal salts include alkali metal carbonates, silicates, phosphonates, aminocarboxylates, sulfates, borates, or the like, and mixtures thereof. Suitable alkali metal salts include alkali metal carbonates, such as sodium or potassium carbonate, bicarbonate, sesquicarbonate, mixtures thereof, and the like; for example, sodium carbonate, potassium carbonate, or mixtures thereof. The composition can include in the range of 0 to about 80 wt-%, about 15 to about 70 wt-% of an alkali metal salt, for example, about 20 to about 60 wt-%.

The basic ingredients in the solid composition when an E-form hydrate is included as the binding agent, and the ranges of molecular equivalents, are shown in the following Table A:

TABLE A

| Composition Mole Ratios of Base Materials (based on composition total weight) | | | |
|---|---|---|---|
| Component | Range of Molar Equivalents in the Composition | | |
| Organic Sequestrant (Phosphonate or amino-carboxylate or mixture thereof) | 1 mole per moles of source of alkalinity and water as listed below | 1 mole per moles of source of alkalinity and water as listed below | 1 mole per moles of source of alkalinity and water as listed below |
| Source of Alkalinity | 20 or less moles per mole of organic sequestrant | 10 or less moles per mole of organic sequestrant, e.g., about 3 to about 10 moles per mole of organic sequestrant | 8 or less moles, e.g., 7 or less moles per mole of organic sequestrant |
| Water | 50 or less moles per mole of organic sequestrant | 20 or less moles per mole of organic sequestrant | 5 to 15 moles per mole of organic sequestrant |

The weight percent of the components will vary, depending upon the particular compounds used, due to the differences in molecular weight of various usable components.

Source of Alkalinity

The solid self-solidifying cleaning compositions according to the invention include an effective amount of one or more alkaline sources to enhance cleaning of a substrate and improve soil removal performance of the composition, in addition to aiding solidification as part of a binding agent. In general, an effective amount of one or more alkaline sources should be considered as an amount that provides a use composition having a pH of at least about 8. When the use composition has a pH of between about 8 and about 10, it can be considered mildly alkaline, and when the pH is greater than about 12, the use composition can be considered caustic. In general, it is desirable to provide the use composition as a mildly alkaline cleaning composition because it is considered to be safer than the caustic based use compositions.

The solid cleaning composition can include an alkali metal carbonate and/or an alkali metal hydroxide. Suitable metal carbonates that can be used include, for example, sodium or potassium carbonate, bicarbonate, sesquicarbonate, mixtures thereof. Suitable alkali metal hydroxides that can be used include, for example, sodium, lithium, or potassium hydroxide. An alkali metal hydroxide can be added to the composition in the form of solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 50 wt-% and a 73 wt-% solution.

The solid cleaning composition can include a sufficient amount of the alkaline source to provide the use composition with a pH of at least about 8. The source of alkalinity is preferably in an amount to enhance the cleaning of a substrate and improve soil removal performance of the composition. In general, it is expected that the concentrate will include the alkaline source in an amount of at least about 5 wt-%, at least about 10 wt-%, or at least about 15 wt-%. The solid cleaning composition can include between about 10 wt-% and about 80 wt-%, preferably between about 15 wt-% and about 70 wt-%, and even more preferably between about 20 wt-% and about 60 wt-% of the source of alkalinity. The source of alkalinity can additionally be provided in an amount to neutralize the anionic surfactant and can be used to assist in the solidification of the composition.

In order to provide sufficient room for other components in the concentrate, the alkaline source can be provided in the concentrate in an amount of less than about 60 wt-%. In addition, the alkaline source can be provided at a level of less than about 40 wt-%, less than about 30 wt-%, or less than about 20 wt-%. In certain embodiments, it is expected that the solid cleaning composition can provide a use composition that is useful at pH levels below about 8. In such compositions, an alkaline source can be omitted, and additional pH adjusting agents can be used to provide the use composition with the desired pH. Accordingly, it should be understood that the source of alkalinity can be characterized as an optional component.

For compositions including carboxylate as a component of the binding agent, the solid cleaning composition can include about 75 wt-%, less than about 60 wt-%, less than about 40 wt-%, less than about 30 wt-%, or less than about 20 wt-%. The alkalinity source may constitute about 0.1 to about 90 wt-%, about 0.5 to about 80 wt-%, or about 1 to about 60 wt-% of the total weight of the solid detergent composition.

Secondary Alkalinity Sources

A self-solidifying solid can include effective amounts of one or more inorganic detergents or alkaline sources to enhance cleaning of a substrate and improve soil removal performance of the composition. As discussed above, in embodiments including an alkali metal salt, such as alkali metal carbonate, the alkali metal salt can act as an alkalinity source. The composition may include a secondary alkaline source separate from the source of alkalinity, and that secondary source can include about 0 to 75 wt-%, about 0.1 to 70 wt-% of, 1 to 25 wt-%, or about 20 to 60 wt-%, or 30 to 70 wt-% of the total composition.

Additional alkalinity sources can include, for example, inorganic alkalinity sources, such as an alkali metal hydroxide or silicate, or the like. Suitable alkali metal hydroxides include, for example, sodium or potassium hydroxide. An alkali metal hydroxide may be added to the composition in a variety of forms, including for example in the form of solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 50 wt-% and a 73 wt-% solution.

Examples of useful alkaline metal silicates include sodium or potassium silicate (with a $M_2O:SiO_2$ ratio of 1:2.4 to 5:1, M representing an alkali metal) or metasilicate.

Other sources of alkalinity include a metal borate such as sodium or potassium borate, and the like; ethanolamines and amines; and other like alkaline sources.

Organic Sequestrant

Suitable organic sequestrants for use in the self-solidifying compositions include organic phosphonate, aminocarboxylic acid, or mixtures thereof.

Organic Phosphonate

Appropriate organic phosphonates include those that are suitable for use in forming the solidified composition with the source of alkalinity and water. Organic phosphonates include organic-phosphonic acids, and alkali metal salts thereof. Some examples of suitable organic phosphonates include: 1-hydroxyethane-1,1-diphosphonic acid: $CH_3C(OH)[PO(OH)_2]_2$; aminotri(methylenephosphonic acid): $N[CH_2PO(OH)_2]_3$; aminotri(methylenephosphonate), sodium salt

2-hydroxyethyliminobis(methylenephosphonic acid): $HOCH_2CH_2N[CH_2PO(OH)_2]_2$; diethylenetriaminepenta(methylenephosphonic acid): $(HO)_2POCH_2N[CH_2CH_2N[CH_2PO(OH)_2]_2]_2$; diethylenetriaminepenta(methylenephosphonate), sodium salt: $C_9H_{(28-x)}N_3Na_xO_{15}P_5$ (x=7); hexamethylenediamine(tetramethylenephosphonate), potassium salt: $C_{10}H_{(28-x)}N_2K_xO_{12}P_4$ (x=6); bis(hexamethylene) triamine(pentamethylenephosphonic acid): $(HO_2)POCH_2N[(CH_2)_6N[CH_2PO(OH)_2]_2]_2$; and phosphorus acid $H_3PO_3$; and other similar organic phosphonates, and mixtures thereof.

These materials are well known sequestrants, but have not been reported as components in a solidification complex material including an source of alkalinity.

Suitable organic phosphonate combinations include ATMP and DTPMP. A neutralized or alkaline phosphonate, or a combination of the phosphonate with an alkali source prior to being added into the mixture such that there is little or no heat or gas generated by a neutralization reaction when the phosphonate is added is suitable.

Aminocarboxylic Acid

The organic sequestrant can also include aminocarboxylic acid type sequestrant. Appropriate aminocarboxylic acid type sequestrants include, but are not limited to, those that are suitable for use in forming the solidified composition with the source of alkalinity and water. Aminocarboxylic acid type sequestrant can include the acids, or alkali metal salts thereof. Some examples of aminocarboxylic acid materials include amino acetates and salts thereof. Some examples include the following: N-hydroxyethylaminodiacetic acid; hydroxyethylenediaminetetraacetic acid, nitrilotriacetic acid (NTA); ethylenediaminetetraacetic acid (EDTA); N-hydroxyethyl-ethylenediaminetriacetic acid (HEDTA); diethylenetriaminepentaacetic acid (DTPA); and alanine-N,N-diacetic acid; and the like; and mixtures thereof.

In an embodiment, the organic sequestrant includes a mixture or blend including two or more organophosphonate compounds, or including two or more aminoacetate compounds, or including at least one organophosphonate and an aminoacetate compound.

Useful aminocarboxylic acids include, for example, n-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), and the like.

Useful aminocarboxylic acid materials containing little or no NTA and no phosphorus include: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), and other similar acids having an amino group with a carboxylic acid substituent.

Examples of suitable biodegradable aminocarboxylates include: ethanoldiglycine, e.g., an alkali metal salt of ethanoldiglycine, such at disodium ethanoldiglycine ($Na_2EDG$); methylgylcinediacetic acid, e.g., an alkali metal salt of methylgylcinediacetic acid, such as trisodium methylgylcinediacetic acid; iminodisuccinic acid, e.g., an alkali metal salt of iminodisuccinic acid, such as iminodisuccinic acid sodium salt; N,N-bis (carboxylatomethyl)-L-glutamic acid (GLDA), e.g., an alkali metal salt of N,N-bis (carboxylatomethyl)-L-glutamic acid, such as iminodisuccinic acid sodium salt ($GLDA-Na_4$); [S—S]-ethylenediaminedisuccinic acid (EDDS), e.g., an alkali metal salt of [S—S]-ethylenediaminedisuccinic acid, such as a sodium salt of [S—S]-ethylenediaminedisuccinic acid; 3-hydroxy-2,2'-iminodisuccinic acid (HIDS), e.g., an alkali metal salt of 3-hydroxy-2,2'-iminodisuccinic acid, such as tetrasodium 3-hydroxy-2,2'-iminodisuccinate.

Examples of suitable commercially available biodegradable aminocarboxylates include: Versene HEIDA (52%), available from Dow Chemical, Midland, MI; Trilon M (40% MGDA), available from BASF Corporation, Charlotte, NC; IDS, available from Lanxess, Leverkusen, Germany; Dissolvine GL-38 (38%), available from Akzo Nobel, Tarrytown, NJ; Octaquest (37%), available from; and HIDS (50%), available from Innospec Performance Chemicals (Octel Performance Chemicals), Edison, NJ.

Water

In some aspects, a solid self-solidifying cleaning composition can include water. Water can be independently added to the composition or can be provided in the composition as a result of its presence in an aqueous material that is added to the composition. Typically, water is introduced into the composition to provide the detergent composition with a desired flowability prior to solidification and to provide a desired rate of solidification.

In general, the water is present as a processing aid and can be removed or become water of hydration. In some embodiments, the water can be present in the solid composition. In certain embodiments of the solid cleaning composition, water can be present at about 0 to about 10 wt-%, about 0.1 to about 10 wt-%, about 2 to about 10 wt-%, about 1 to about 5 wt-%, or about 2 to about 3 wt-%. In certain embodiments of the solid cleaning composition, water can be present at about 25 to about 40 wt-%, about 27 to about 20 wt-%, or about 29 wt-% to about 31 wt-%. Water can be provided, for example, as deionized water or as softened water.

When preparing a carboxylate containing solid compositions by pressing and/or vibrating, water may be present at about 5 to about 25 wt-%, about 7 to about 20 wt-%, or about 8 to about 15 wt-%.

Some examples of representative constituent concentrations for embodiments of the present compositions can be found in Tables B and C, in which the values are given in wt-% of the ingredients in reference to the total composition weight. In certain embodiments, the proportions and amounts in Tables B and C can be modified by "about".

TABLE B

| Ingredient | wt-% | wt-% | wt-% | wt-% |
|---|---|---|---|---|
| Carbonate Salt | 10-70 | 40-70 | 40-70 | 10-20 |
| Bicarbonate Salt (optional) | 3 | 3 | 3 | — |
| Sequestrant | 1-80 | 5-80 | 5-50 | 1-4 |
| Surfactant | 0-5 | 4-5 | 4-5 | — |
| Builder | 0.5-45 | 0.5-25 | 3-35 | 40-50 |
| Secondary Alkalinity Source | 3-8 | 3-8 | 3-8 | 2-5 |
| Water | 0-34 | 0-34 | 1-5 | — |
| Sodium Hydroxide | 0-40 | — | — | 30-40 |

TABLE C

| Ingredient | wt-% | wt-% | wt-% | wt-% | wt-% | wt-% | wt-% |
|---|---|---|---|---|---|---|---|
| Carbonate | 53 | 40-60 | 50-60 | 9-40 | 46-53 | 0-10 | 66 |
| amino carboxylate (eg., biodegradable) | 0-11 | 0-10 | 5-16 | 0-44 | 0-22 | 0-20 | 12 |
| citrate | 14-25 | 10-26 | 20 | | 0-2 | 0-35 | |
| Hydroxide salt | | | | 17-37 | 0-5 | | |
| polymer polycarboxylate | 1 | 1 | 1 | 0-2 | 0-1 | | 5 |
| Sulfonated polymer | | 6-13 | | | | | |
| phosphonate | | | | 5-13 | 5-12 | | |
| Water | 8 | 0-25 | 0-10 | | 0-3 | | |
| secondary alkalinity | 3 | 3 | 3 | 1-20 | 0-3 | 0-0.5 | 4 |
| tripolyphosphate | | | | 0-50 | 0-25 | | |
| polyol | | | | 0-4 | | | |
| Surfactant | 5 | 3-5 | 3-5 | | 3.5-4.5 | 0-45 | 8 |

Additives

Solid self-solidifying cleaning compositions made according to the invention may further include additional functional materials or additives that provide a beneficial property, for example, to the composition in solid form or when dispersed or dissolved in an aqueous solution, e.g., for a particular use. Examples of conventional additives include one or more of each of salt, surfactant, detersive polymer, cleaning agent, rinse aid composition, softener, pH modifier, source of acidity, anti-corrosion agent, secondary hardening agent, solubility modifier, detergent builder, detergent filler, defoamer, anti-redeposition agent, antimicrobial, rinse aid composition, threshold agent or system, aesthetic enhancing agent (i.e., dye, odorant, perfume), optical brightener, lubricant composition, bleaching agent or additional bleaching agent, enzyme, effervescent agent, activator for the source of alkalinity, other such additives or functional ingredients, and the like, and mixtures thereof.

Adjuvants and other additive ingredients will vary according to the type of composition being manufactured, and the intended end use of the composition. In certain embodiments, the composition includes as an additive one or more of surfactant, detergent builder, cleaning enzyme, detersive polymer, antimicrobial, activators for the source of alkalinity, or mixtures thereof.

Metal Protecting Silicate

In some embodiments, an effective amount of an alkaline metal silicate or hydrate thereof can be employed in the compositions and processes of the invention to form a stable solid self-solidifying composition that can have metal protecting capacity. The silicates employed in the compositions of the invention are those that have conventionally been used in warewashing formulations. For example, typical alkali metal silicates are those powdered, particulate or granular silicates which are either anhydrous or preferably which contain water of hydration (5 to 25 wt %, preferably 15 to 20 wt % water of hydration). These silicates can be sodium silicates and have a $Na_2O:SiO_2$ ratio of about 1:1 to about 1:5, respectively, and typically contain available bound water in the amount of from 5 to about 25 wt %. In general, the silicates of the present invention have a $Na_2O:SiO_2$ ratio of 1:1 to about 1:3.75, preferably about 1:1.5 to about 1:3.75 and most preferably about 1:1.5 to about 1:2.5. A silicate with a $Na_2O:SiO_2$ ratio of about 1:2 and about 16 to 22 wt % water of hydration is suitable.

For example, such silicates are available in powder form as GD Silicate and in granular form as Britesil H-20, from PQ Corporation. These ratios may be obtained with single silicate compositions or combinations of silicates which upon combination result in the preferred ratio. The hydrated silicates at preferred ratios, a $Na_2O:SiO_2$ ratio of about 1:1.5 to about 1:2.5 have been found to provide the optimum metal protection and rapidly forming solid block detergent. The amount of silicate used in forming the compositions of the invention tend to vary between 10 and 30 wt %, preferably about 15 to 30 wt % depending on degree of hydration. Hydrated silicates are preferred.

Suitable silicates for use in the present compositions include sodium silicate, anhydrous sodium metasilicate, and anhydrous sodium silicate. In some embodiments, a self-solidifying cleaning composition includes: about 1-30 wt % of an alkali metal salt of an organo-phosphonate; about 5-15 wt % water; about 12-25 wt % of an alkali metal silicate (e.g., hydrated silicate, 5-25% water); about 25-80 wt % of an alkali metal carbonate; and about 0 to 25 wt % of a surfactant. In other embodiments, a self solidifying cleaning composition includes about 3-15 wt % of an alkali metal salt of an organo-phosphonate; about 5-12 wt % water; about 15-30 wt % of an alkali metal silicate (e.g., hydrated silicate, 5-25% water); about 30-55 wt % of an alkali metal carbonate; and about 0.1 to 20 wt % of a surfactant.

Salt

In some embodiments, salts, for example acidic salts, can be included as pH modifiers, sources of acidity, effervescing aids, or other like uses. Some examples of salts for use in such applications include sodium bisulfate, sodium acetate, sodium bicarbonate, citric acid salts, and the like and mixtures thereof. The composition can include in the range of 0.1 to 50 wt-% such material. It should be understood that agents other than salts that act as pH modifiers, sources of acidity, effervescing aids, or like, can also be used in conjunction with the invention.

Active Oxygen Compounds

The active oxygen compound acts to provide a source of active oxygen, but can also act to form at least a portion of the solidification or binding agent. The active oxygen compound can be inorganic or organic, and can be a mixture thereof. Some examples of active oxygen compound include peroxygen compounds, and peroxygen compound adducts that are suitable for use in forming the binding agent.

Many active oxygen compounds are peroxygen compounds. Any peroxygen compound generally known and that can function, for example, as part of the binding agent can be used. Examples of suitable peroxygen compounds include inorganic and organic peroxygen compounds, or mixtures thereof.

Inorganic Active Oxygen Compound

Examples of inorganic active oxygen compounds include the following types of compounds or sources of these compounds, or alkali metal salts including these types of compounds, or forming an adduct therewith:hydrogen peroxide; group 1 (IA) active oxygen compounds, for example lithium peroxide, sodium peroxide, and the like; group 2 (IIA) active oxygen compounds, for example magnesium peroxide, calcium peroxide, strontium peroxide, barium peroxide, and the like; group 12 (IIB) active oxygen compounds, for example zinc peroxide, and the like; group 13 (IIIA) active oxygen compounds, for example boron compounds, such as perborates, for example sodium perborate hexahydrate of the formula $Na_2[B_2(O_2)_2(OH)_4]\cdot 6H_2O$ (also called sodium perborate tetrahydrate and formerly written as $NaBO_3\cdot 4H_2O$); sodium peroxyborate tetrahydrate of the formula $Na_2B_2(O_2)_2[(OH)_4]\cdot 4H_2O$ (also called sodium perborate trihydrate, and formerly written as $NaBO_3\cdot 3H_2O$); sodium peroxyborate of the formula $Na_2[B_2(O_2)_2(OH)_4]$ (also called sodium perborate monohydrate and formerly written as $NaBO_3\cdot H_2O$); and the like; e.g., perborate; group 14 (IVA) active oxygen compounds, for example persilicates and peroxycarbonates, which are also called percarbonates, such as persilicates or peroxycarbonates of alkali metals; and the like; e.g., percarbonate, e.g., persilicate; group 15 (VA) active oxygen compounds, for example peroxynitrous acid and its salts; peroxyphosphoric acids and their salts, for example, perphosphates; and the like; e.g., perphosphate; group 16 (VIA) active oxygen compounds, for example peroxysulfuric acids and their salts, such as peroxymonosulfuric and peroxydisulfuric acids, and their salts, such as persulfates, for example, sodium persulfate; and the like; e.g., persulfate; group VIIa active oxygen compounds such as sodium periodate, potassium perchlorate and the like.

Other active inorganic oxygen compounds can include transition metal peroxides; and other such peroxygen compounds, and mixtures thereof.

In certain embodiments, the compositions and methods of the present invention employ certain of the inorganic active oxygen compounds listed above. Suitable inorganic active oxygen compounds include hydrogen peroxide, hydrogen peroxide adduct, group IIIA active oxygen compounds, group VIA active oxygen compound, group VA active oxygen compound, group VIIA active oxygen compound, or mixtures thereof. Examples of such inorganic active oxygen compounds include percarbonate, perborate, persulfate, perphosphate, persilicate, or mixtures thereof. Hydrogen peroxide presents an example of an inorganic active oxygen compound. Hydrogen peroxide can be formulated as a mixture of hydrogen peroxide and water, e.g., as liquid hydrogen peroxide in an aqueous solution. The mixture of solution can include about 5 to about 40 wt-% hydrogen peroxide or 5 to 50 wt-% hydrogen peroxide.

In an embodiment, the inorganic active oxygen compounds include hydrogen peroxide adduct. For example, the inorganic active oxygen compounds can include hydrogen peroxide, hydrogen peroxide adduct, or mixtures thereof. Any of a variety of hydrogen peroxide adducts are suitable for use in the present compositions and methods. For example, suitable hydrogen peroxide adducts include percarbonate salt, urea peroxide, peracetyl borate, an adduct of $H_2O_2$ and polyvinyl pyrrolidone, sodium percarbonate, potassium percarbonate, mixtures thereof, or the like. Suitable hydrogen peroxide adducts include percarbonate salt, urea peroxide, peracetyl borate, an adduct of $H_2O_2$ and polyvinyl pyrrolidone, or mixtures thereof. Suitable hydrogen peroxide adducts include sodium percarbonate, potassium percarbonate, or mixtures thereof, e.g., sodium percarbonate.

Organic Active Oxygen Compound

Any of a variety of organic active oxygen compounds can be employed in the compositions and methods of the present invention. For example, the organic s active oxygen compound can be a peroxycarboxylic acid, such as a mono- or di-peroxycarboxylic acid, an alkali metal salt including these types of compounds, or an adduct of such a compound. Suitable peroxycarboxylic acids include $C_1$-$C_{24}$ peroxycarboxylic acid, salt of $C_1$-$C_{24}$ peroxycarboxylic acid, ester of $C_1$-$C_{24}$ peroxycarboxylic acid, diperoxycarboxylic acid, salt of diperoxycarboxylic acid, ester of diperoxycarboxylic acid, or mixtures thereof.

Suitable peroxycarboxylic acids include $C_1$-$C_{10}$ aliphatic peroxycarboxylic acid, salt of $C_1$-$C_{10}$ aliphatic peroxycarboxylic acid, ester of $C_1$-$C_{10}$ aliphatic peroxycarboxylic acid, or mixtures thereof; e.g., salt of or adduct of peroxyacetic acid; e.g., peroxyacetyl borate. Suitable diperoxycarboxylic acids include $C_4$-$C_{10}$ aliphatic diperoxycarboxylic acid, salt of $C_4$-$C_{10}$ aliphatic diperoxycarboxylic acid, or ester of $C_4$-$C_{10}$ aliphatic diperoxycarboxylic acid, or mixtures thereof; e.g., a sodium salt of perglutaric acid, of persuccinic acid, of peradipic acid, or mixtures thereof.

Organic active oxygen compounds include other acids including an organic moiety. Suitable organic active oxygen compounds include perphosphonic acids, perphosphonic acid salts, perphosphonic acid esters, or mixtures or combinations thereof.

Active Oxygen Compound Adducts

Active oxygen compound adducts include any generally known and that can function, for example, as a source of active oxygen and as part of the solidified composition. Hydrogen peroxide adducts, or peroxyhydrates, are suitable. Some examples of source of alkalinity adducts include the following: alkali metal percarbonates, for example sodium percarbonate (sodium carbonate peroxyhydrate), potassium percarbonate, rubidium percarbonate, cesium percarbonate, and the like; ammonium carbonate peroxyhydrate, and the like; urea peroxyhydrate, peroxyacetyl borate; an adduct of $H_2O_2$ polyvinyl pyrrolidone, and the like, and mixtures of any of the above.

Chelating/Sequestering Agents

Other chelating/sequestering agents, in addition to the phosphonate or aminocarboxylic acid sequestrant discussed above, can be added to the composition and are useful for their sequestering properties. In general, a chelating/sequestering agent is a molecule capable of coordinating (i.e., binding) the metal ions commonly found in natural water to prevent the metal ions from interfering with the action of the other detersive ingredients of a cleaning composition. The chelating/sequestering agent may also function as a threshold agent when included in an effective amount. In certain embodiments, a cleaning composition includes about 0.1-70 wt-% or about 5-60 wt-%, of a chelating/sequestering agent. Examples of chelating/sequestering agents include aminocarboxylic acids, condensed phosphates, polymeric polycarboxylates, and the like.

Examples of condensed phosphates include sodium and potassium orthophosphate, sodium and potassium pyrophosphate, sodium and potassium tripolyphosphate, sodium hexametaphosphate, and the like. A condensed phosphate may also assist, to a limited extent, in solidification of the composition by fixing the free water present in the composition as water of hydration.

Water conditioning polymers can be used as non-phosphorus containing builders. Suitable water conditioning polymers include, but are not limited to: polycarboxylates. Suitable polycarboxylates that can be used as builders and/or water conditioning polymers include, but are not limited to: those having pendant carboxylate ($—CO_2^-$) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at substoichiometric levels to function as crystal modifiers In an embodiment, organic sequestrants include amino tri(methylene phosphonic) acid, 1-hydroxyethylidene-1,1-diphosphonic acid, diethylenetriaminepenta(methylene phosphonic) acid, alanine-N,N-diacetic acid, diethylenetriaminepentaacetic acid, or alkali metal salts thereof, or mixtures thereof. In this embodiment, alkali metal salts include sodium, potassium, calcium, magnesium, or mixtures thereof. The organic sequestrant can include one or more of 1-hydroxyethylidene-1,1-diphosphonic acid; or diethylenetriaminepenta(methylene phosphonic) acid; or alanine-N,N-diacetic acid; or diethylenetriaminepentaacetic acid.

For compositions including a carboxylate as a component of the binding agent, suitable levels of addition for builders that can also be chelating or sequestering agents are about 0.1 to about 70 wt-%, about 1 to about 60 wt-%, or about 1.5 to about 50 wt-%. The solid detergent can include about 1 to about 60 wt-%, about 3 to about 50 wt-%, or about 6 to about 45 wt-% of the builders. Additional ranges of the builders include about 3 to about 20 wt-%, about 6 to about 15 wt-%, about 25 to about 50 wt-%, or about 35 to about 45 wt-%.

Glass and Metal Corrosion Inhibitors

The solid self-solidifying cleaning composition can include a metal corrosion inhibitor in an amount up to about 50 wt-%, about 1 to about 40 wt-%, or about 3 to about 30 wt-%. The corrosion inhibitor is included in the solid composition in an amount sufficient to provide a use solution that exhibits a rate of corrosion and/or etching of glass that is less than the rate of corrosion and/or etching of glass for an otherwise identical use solution except for the absence of the corrosion inhibitor. In some embodiments, the use solution includes at least about 6 parts per million (ppm) of the corrosion inhibitor to provide desired corrosion inhibition properties. Larger amounts of corrosion inhibitor can be used in the use solution without deleterious effects. However, at a certain point, the additive effect of increased corrosion and/or etching resistance with increasing corrosion inhibitor concentration will be lost, and additional corrosion inhibitor will simply increase the cost of using the solid composition. The use solution can include about 6 ppm to about 300 ppm of the corrosion inhibitor or about 20 ppm to about 200 ppm of the corrosion inhibitor. Examples of suitable corrosion inhibitors include, but are not limited to: a combination of a source of aluminum ion and a source of zinc ion, as well as an alkaline metal silicate or hydrate thereof.

The corrosion inhibitor can refer to the combination of a source of aluminum ion and a source of zinc ion. The source of aluminum ion and the source of zinc ion provide aluminum ion and zinc ion, respectively, when the solid detergent composition is provided in the form of a use solution. The amount of the corrosion inhibitor is calculated based upon the combined amount of the source of aluminum ion and the source of zinc ion. Anything that provides an aluminum ion in a use solution can be referred to as a source of aluminum ion, and anything that provides a zinc ion when provided in a use solution can be referred to as a source of zinc ion. It is not necessary for the source of aluminum ion and/or the source of zinc ion to react to form the aluminum ion and/or the zinc ion. Aluminum ions can be considered a source of aluminum ion, and zinc ions can be considered a source of zinc ion. The source of aluminum ion and the source of zinc ion can be provided as organic salts, inorganic salts, and mixtures thereof. Suitable sources of aluminum ion include, but are not limited to: aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, aluminum zinc sulfate, and aluminum phosphate. Suitable sources of zinc ion include, but are not limited to: zinc salts such as zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluorosilicate, and zinc salicylate.

Controlling the ratio of the aluminum ion to the zinc ion in the use solution provides reduced corrosion and/or etching of glassware and ceramics compared with the use of either component alone. That is, the combination of the aluminum ion and the zinc ion can provide a synergy in the reduction of corrosion and/or etching. The ratio of the source of aluminum ion to the source of zinc ion can be controlled to provide a synergistic effect. In general, the weight ratio of aluminum ion to zinc ion in the use solution can be at least about 6:1, can be less than about 1:20, and can be about 2:1 and about 1:15.

An effective amount of an alkaline metal silicate or hydrate thereof can be employed in the compositions and processes of the invention to form a stable solid detergent composition having metal protecting capacity. The silicates employed in the compositions of the invention are those that have conventionally been used in solid detergent formulations. For example, typical alkali metal silicates are those powdered, particulate or granular silicates which are either anhydrous or preferably which contain water of hydration (about 5% to about 25 wt-%, about 15% to about 20 wt-% water of hydration). These silicates are preferably sodium silicates and have a $Na_2O:SiO_2$ ratio of about 1:1 to about 1:5, respectively, and typically contain available water in the amount of from about 5% to about 25 wt-%. In general, the silicates have a $Na_2O:SiO_2$ ratio of about 1:1 to about 1:3.75, about 1:1.5 to about 1:3.75 and most about 1:1.5 to about 1:2.5. A silicate with a $Na_2O:SiO_2$ ratio of about 1:2 and about 16% to about 22 wt-% water of hydration, is most preferred. For example, such silicates are available in powder form as GD Silicate and in granular form as Britesil H-20, available from PQ Corporation, Valley Forge, PA. These ratios may be obtained with single silicate compositions or combinations of silicates which upon combination result in the preferred ratio. The hydrated silicates at preferred ratios, a $Na_2O:SiO_2$ ratio of about 1:1.5 to about 1:2.5, have been found to provide the optimum metal protection and rapidly form a solid detergent. Hydrated silicates are preferred.

Silicates can be included in the solid detergent composition to provide for metal protection but are additionally known to provide alkalinity and additionally function as anti-redeposition agents. Suitable silicates include, but are not limited to: sodium silicate and potassium silicate. The solid detergent composition can be provided without silicates, but when silicates are included, they can be included in amounts that provide for desired metal protection. The composition can include silicates in amounts of at least about 1 wt-%, at least about 5 wt-%, at least about 10 wt-%, and at least about 15 wt-%. In addition, in order to provide sufficient room for other components in the composition, the silicate component can be provided at a level of less than about 20 wt-%, less than about 25 wt-%, less than about 20 wt-%, or less than about 15 wt-%.

Organic Surfactants or Cleaning Agents

The composition can include at least one cleaning agent which can be a surfactant or surfactant system. A variety of surfactants can be used in a cleaning composition, including anionic, nonionic, cationic, and zwitterionic surfactants, which are commercially available from a number of sources. Nonionic agents are suitable. For a discussion of surfactants, see Kirk-Othmer, *Encyclopedia of Chemical Technology*, Third Edition, volume 8, pages 900-912. For example, the cleaning composition includes a cleaning agent in an amount effective to provide a desired level of cleaning, which can be about 0-20 wt-% or about 1.5-15 wt-%.

Anionic surfactants useful in the present cleaning compositions, include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Suitable anionics are sodium alkylarylsulfonate, alpha-olefin sulfonate, and fatty alcohol sulfates.

Nonionic surfactants useful in cleaning compositions, include those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark PLURONIC (BASF-Wyandotte), and the like; ethoxylated amines and ether amines commercially available from Tomah Corporation and other like nonionic compounds. Silicone surfactants such as the ABIL B8852 (Goldschmidt) can also be used.

Cationic surfactants useful for inclusion in a cleaning composition for fabric softening or for reducing the population of one or more microbes include amines such as primary, secondary and tertiary monoamines with $C_{6-24}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_6$-$C_{24}$)dimethylbenzyl ammonium chloride, n-tetradecyldimethylbenzylammonium chloride monohydrate, a naphthalene-substituted quaternary ammonium chloride such as dimethyl-1-naphthylmethylammonium chloride, and the like; and other like cationic surfactants.

Antimicrobials

Antimicrobial agents are chemical compositions that can be used in a solid functional material that alone, or in combination with other components, act to reduce or prevent microbial contamination and deterioration of commercial products material systems, surfaces, etc. In some aspects, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that the source of alkalinity used in the formation of compositions embodying the invention also act as antimicrobial agents, and can even provide sanitizing activity. In fact, in some embodiments, the ability of the source of alkalinity to act as an antimicrobial agent reduces the need for secondary antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their anti-microbial properties. In some embodiments, an antimicrobial component, such as TAED can be included in the range of 0.001 to 75 wt-% of the composition, about 0.01 to 20 wt-%, or about 0.05 to about 10 wt-%.

If present in compositions, the additional antimicrobial agent can be about 0.01 to about 30 wt-% of the composition, 0.05 to about 10 wt-%, or about 0.1 to about 5 wt-%. In a use solution the additional antimicrobial agent can be about 0.001 to about 5 wt-% of the composition, about 0.01 to about 2 wt-%, or about 0.05 to about 0.5 wt-%.

Activators

In some embodiments, the antimicrobial activity or bleaching activity of the composition can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of 0.001 to 75% by wt. of the composition, about 0.01 to about 20, or about 0.05 to about 10% by wt of the composition.

In other embodiments, the activator for the source of alkalinity combines with the active oxygen to form an antimicrobial agent.

The solid composition typically remains stable even in the presence of activator of the source of alkalinity. In many compositions would be expected to react with and destabilize or change the form of the source of alkalinity. In contrast, in an embodiment of the present invention, the composition remains solid; it does not swell, crack, or enlarge as it would if the source of alkalinity were reacting with the activator.

In some embodiments, the composition includes a solid block, and an activator material for the active oxygen is coupled to the solid block. The activator can be coupled to the solid block by any of a variety of methods for coupling one solid cleaning composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the cleaning composition, such as by a plastic or shrink wrap or film.

Rinse Aid Functional Materials

Functional materials of the invention can include a formulated rinse aid composition containing a wetting or sheeting agent combined with other optional ingredients in a solid made using the complex of the invention. The rinse aid component of the present invention can include a water soluble or dispersible low foaming organic material capable of reducing the surface tension of the rinse water to promote sheeting action and to prevent spotting or streaking caused by beaded water after rinsing is completed. This is often used in warewashing processes. Such sheeting agents are typically organic surfactant-like materials having a characteristic cloud point. The cloud point of the surfactant rinse or sheeting agent is defined as the temperature at which a 1 wt-% aqueous solution of the surfactant turns cloudy when warmed.

There are two general types of rinse cycles in commercial warewashing machines, a first type generally considered a sanitizing rinse cycle uses rinse water at a temperature of about 180° F., about 80° C. or higher. A second type of non-sanitizing machines uses a lower temperature non-sanitizing rinse, typically at a temperature of about 125° F., about 50° C. or higher. Surfactants useful in these applications are aqueous rinses having a cloud point greater than the available hot service water. Accordingly, the lowest useful cloud point measured for the surfactants of the invention is approximately 40° C. The cloud point can also be 60° C. or higher, 70° C. or higher, 80° C. or higher, etc., depending on the use locus hot water temperature and the temperature and type of rinse cycle.

Suitable sheeting agents, typically include a polyether compound prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. Such sheeting agents have a molecular weight in the range of about 500 to 15,000. Certain types of (PO)(EO) polymeric rinse aids have been found to be useful containing at least one block of poly(PO) and at least one block of poly(EO) in the polymer molecule. Additional blocks of poly(EO), poly PO or random polymerized regions can be formed in the molecule.

Particularly useful polyoxypropylene polyoxyethylene block copolymers are those including a center block of polyoxypropylene units and blocks of polyoxyethylene units to each side of the center block. Such polymers have the formula shown below:

$$(EO)_n—(PO)_m\text{-}(EO)_n$$

wherein n is an integer of 20 to 60, each end is independently an integer of 10 to 130. Another useful block copolymer are block copolymers having a center block of polyoxyethylene units and blocks of polyoxypropylene to each side of the center block. Such copolymers have the formula:

$$(PO)_n\text{-}(EO)_m—(PO)_n$$

wherein m is an integer of 15 to 175 and each end are independently integers of about 10 to 30. The solid functional materials of the invention can often use a hydrotrope to aid in maintaining the solubility of sheeting or wetting agents. Hydrotropes can be used to modify the aqueous solution creating increased solubility for the organic material. Suitable hydrotropes are low molecular weight aromatic sulfonate materials such as xylene sulfonates and dialkyldiphenyl oxide sulfonate materials.

In an embodiment, compositions according to the present invention provide desirable rinsing properties in ware washing without employing a separate rinse agent in the rinse cycle. For example, good rinsing occurs using such compositions in the wash cycle when rinsing employs just soft water.

Additional Bleaching Agents

Additional bleaching agents for use in inventive formulations for lightening or whitening a substrate, include bleaching compounds capable of liberating an active halogen species, such as $Cl_2$, $Br_2$, $I_2$, $ClO_2$, $BrO_2$, $IO_2$, —$OCl^-$, —$OBr^-$ and/or, —$OI^-$, under conditions typically encountered during the cleansing process. Suitable bleaching agents for use in the present cleaning compositions include, for example, chlorine-containing compounds such as a chlorite, a hypochlorite, chloramine. Suitable halogen-releasing compounds include the alkali metal dichloroisocyanurates, chlorinated trisodium phosphate, the alkali metal hypochlorites, alkali metal chlorites, monochloramine and dichloramine, and the like, and mixtures thereof. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be an additional peroxygen or active oxygen source such as hydrogen peroxide, perborates, for example sodium perborate mono and tetrahydrate, sodium carbonate peroxyhydrate, phosphate peroxyhydrates, and potassium permonosulfate, with and without activators such as tetraacetylethylene diamine, and the like, as discussed above.

A cleaning composition may include a minor but effective additional amount of a bleaching agent above that already available from the stabilized source of alkalinity, e.g., about 0.1-10 wt-% or about 1-6 wt-%. The present solid compositions can include bleaching agent in an amount of about 0.1 to about 60 wt-%, about 1 to about 20 wt-%, about 3 to about 8 wt-%, or about 3 to about 6 wt-%.

Secondary Hardening Agents/Solubility Modifiers.

The present compositions may include a minor but effective amount of a secondary hardening agent, as for example, an amide such stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the cleaning agent and/or other active ingredients may be dispensed from the solid composition over an extended period of time. The composition may include a secondary hardening agent in an amount of about 5-20 wt-% or about 10-15 wt-%.

Detergent Fillers

A cleaning composition may include an effective amount of one or more of a detergent filler which does not perform as a cleaning agent per se, but cooperates with the cleaning agent to enhance the overall processability of the composition. Examples of fillers suitable for use in the present cleaning compositions include sodium sulfate, sodium chloride, starch, sugars, $C_1$-$C_{10}$ alkylene glycols such as propylene glycol, and the like. A filler such as a sugar (e.g. sucrose) can aid dissolution of a solid composition by acting as a disintegrant. A detergent filler can be included in an amount up to about 50 wt-%, of about 1 to about 20 wt-%, about 3 to about 15 wt-%, about 1 to about 30 wt-%, or about 1.5 to about 25 wt-%.

Defoaming Agents

An effective amount of a defoaming agent for reducing the stability of foam may also be included in the present cleaning compositions. The cleaning composition can include about 0.0001-5 wt-% of a defoaming agent, e.g., about 0.01-3 wt-%. The defoaming agent can be provided in an amount of about 0.0001% to about 10 wt-%, about 0.001% to about 5 wt-%, or about 0.01% to about 1.0 wt-%.

Examples of defoaming agents suitable for use in the present compositions include silicone compounds such as silica dispersed in polydimethylsiloxane, EO/PO block copolymers, alcohol alkoxylates, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-Redeposition Agents

A cleaning composition may also include an anti-redeposition agent capable of facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. A cleaning composition may include about 0.5 to about 10 wt-%, e.g., about 1 to about 5 wt-%, of an anti-redeposition agent.

Optical Brighteners

Optical brightener is also referred to as fluorescent whitening agents or fluorescent brightening agents provide optical compensation for the yellow cast in fabric substrates. With optical brighteners yellowing is replaced by light emitted from optical brighteners present in the area commensurate in scope with yellow color. The violet to blue light supplied by the optical brighteners combines with other light reflected from the location to provide a substantially complete or enhanced bright white appearance. This additional light is produced by the brightener through fluorescence. Optical brighteners absorb light in the ultraviolet range 275 through 400 nm. and emit light in the ultraviolet blue spectrum 400-500 nm.

Fluorescent compounds belonging to the optical brightener family are typically aromatic or aromatic heterocyclic materials often containing condensed ring system. An important feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (cumarins, naphthalamides, triazines, etc.). The choice of optical brighteners for use in detergent compositions will depend upon a number of factors, such as the type of detergent, the nature of other components present in the detergent composition, the temperature of the wash water, the degree of agitation, and the ratio of the material washed to the tub size. The brightener selection is also dependent upon the type of material to be cleaned, e.g., cottons, synthetics, etc. Since most laundry detergent products are used to clean a variety of fabrics, the detergent compositions should contain a mixture of brighteners which are effective for a variety of fabrics. It is of course necessary that the individual components of such a brightener mixture be compatible.

Optical brighteners useful in the present invention are commercially available and will be appreciated by those skilled in the art. Commercial optical brighteners which may be useful in the present invention can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful in the present invention include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene.

For laundry cleaning or sanitizing compositions, suitable optical brighteners include stilbene derivatives, which can be employed at concentrations of up to 1 wt-%.

Stabilizing Agents

The solid detergent composition may also include a stabilizing agent. Examples of suitable stabilizing agents include, but are not limited to: borate, calcium/magnesium ions, propylene glycol, and mixtures thereof. The composition need not include a stabilizing agent, but when the composition includes a stabilizing agent, it can be included in an amount that provides the desired level of stability of the composition. Suitable ranges of the stabilizing agent include up to about 20 wt-%, about 0.5 to about 15 wt-%, or about 2 to about 10 wt-%.

Dispersants

The solid detergent composition may also include a dispersant. Examples of suitable dispersants that can be used in the solid detergent composition include, but are not limited to: maleic acid/olefin copolymers, polyacrylic acid, and mixtures thereof. The composition need not include a dispersant, but when a dispersant is included it can be included in an amount that provides the desired dispersant properties. Suitable ranges of the dispersant in the composition can be up to about 20 wt-%, about 0.5 to about 15 wt-%, or about 2 to about 9 wt-%.

Enzymes

Enzymes that can be included in the solid detergent composition include those enzymes that aid in the removal of starch and/or protein stains. Suitable types of enzymes include, but are not limited to: proteases, alpha-amylases, and mixtures thereof. Suitable proteases that can be used include, but are not limited to: those derived from *Bacillus licheniformix, Bacillus lenus, Bacillus alcalophilus*, and *Bacillus amyloliquefacins*. Suitable alpha-amylases include *Bacillus subtilis, Bacillus amyloliquefaciens*, and *Bacillus licheniformis*. The composition need not include an enzyme, but when the composition includes an enzyme, it can be included in an amount that provides the desired enzymatic activity when the solid detergent composition is provided as a use composition. Suitable ranges of the enzyme in the composition include up to about 15 wt-%, about 0.5 to about 10 wt-%, or about 1 to about 5 wt-%.

Thickeners

The solid detergent compositions can include a rheology modifier or a thickener. The rheology modifier may provide the following functions: increasing the viscosity of the compositions; increasing the particle size of liquid use solutions when dispensed through a spray nozzle; providing the use solutions with vertical cling to surfaces; providing particle suspension within the use solutions; or reducing the evaporation rate of the use solutions.

The rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface. However, once the material comes to rest on a soiled surface, the materials can regain high viscosity to ensure that the material remains in place on the soil. Preferably, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact substantial quantities of the film of the material with the soil for at least a minute, five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, PA; and Carbopol, available from B.F. Goodrich, Charlotte, NC.

Examples of suitable polymeric thickeners include, but not limited to: polysaccharides. An example of a suitable commercially available polysaccharide includes, but is not limited to, Diutan, available from Kelco Division of Merck, San Diego, CA. Thickeners for use in the solid detergent compositions further include polyvinyl alcohol thickeners, such as, fully hydrolyzed (greater than 98.5 mol acetate replaced with the —OH function).

An example of a suitable polysaccharide includes, but is not limited to, xanthans. Such xanthan polymers are preferred due to their high water solubility, and great thickening power. Xanthan is an extracellular polysaccharide of *Xanthomonas campestras*. Xanthan may be made by fermentation based on corn sugar or other corn sweetener by-products. Xanthan includes a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Preferred xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is herein incorporated by reference. Suitable crosslinking agents for xanthan materials include, but are not limited to: metal cations such as Al+3, Fe+3, Sb+3, Zr+4 and other transition metals. Examples of suitable commercially available xanthans include, but are not limited to: KELTROL®, KELZAN® AR, KELZAN® D35, KELZAN® S, KELZAN® XZ, available from Kelco Division of Merck, San Diego, CA. Known organic crosslinking agents can also be used. A preferred crosslinked xanthan is KELZAN® AR, which provides a pseudo plastic use solution that can produce large particle size mist or aerosol when sprayed.

Dyes/Odorants

Various dyes, odorants including perfumes, and other aesthetic enhancing agents may also be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

Cleaning Agent Compositions

In some aspects, the present invention can include cleaning agent compositions. In some embodiments, the cleaning agent composition can enhance the solidification of the composition. In other embodiments, the cleaning agent composition does not participate in the solidification of the composition, e.g., it solely enhances the soil removal capabilities of the compositions.

Cleaning agents suitable for use with the solid compositions include, but are not limited to: combinations of carboxylic acids and aminocarboxylates; compositions including soluble magnesium compounds, insoluble magnesium compounds and combinations thereof. Exemplary cleaning compositions are described for example, in U.S. patent application Ser. Nos. 12/114,327; 12/114,385; 12/114,355; 12/114,486; 12/114,513; 12/114,342; 12/114,329; and 12/114,364, each of which is hereby incorporated by reference.

Embodiments of Solids

A solid cleaning composition as used in the present disclosure encompasses a variety of forms including, for example, solids, pellets, blocks, and tablets, but not powders. It should be understood that the term "solid" refers to the state of the detergent composition under the expected conditions of storage and use of the solid cleaning composition. In general, it is expected that the detergent composition will remain a solid when provided at a temperature of up to about 100° F. or greater than 120° F.

In certain embodiments, the solid cleaning composition is provided in the form of a unit dose. A unit dose refers to a solid cleaning composition unit sized so that the entire unit is used during a single washing cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid cleaning composition is provided in the form of a multiple-use solid, such as, a block or a plurality of pellets, and can be repeatedly used to generate aqueous detergent compositions for multiple washing cycles. In certain embodiments, the solid cleaning composition is provided as a solid having a mass of about 5 g to 10 kg. In certain embodiments, a multiple-use form of the solid cleaning composition has a mass of about 1 to 10 kg. In further embodiments, a multiple-use form of the solid cleaning composition has a mass of about 5 kg to about 8 kg. In other embodiments, a multiple-use form of the solid cleaning composition has a mass of about 5 g to about 1 kg, or about 5 g and to 500 g.

In some embodiments, the solids formed by the methods described herein comprise a multi-part system. The solids can be a two-part, three-part, or four-part system for example. In some embodiments, each part will include the same composition. In other embodiments, each part will include different compositions. In still yet other embodiments, some parts can include equivalent compositions and some parts can include different compositions, e.g., a three part system where two of the parts include the same composition and one of the parts includes a different composition.

The parts can be formed to provide the solid with a variety of desired characteristics including, for example: multiple cleaning formulations (e.g., one part includes an acidic cleaner, one part includes an alkaline cleaner, and a third optional part includes a buffer, wherein the third part can be positioned between the first and second parts); or solids designed to have different parts with different dissolution rates (e.g., one part contains a fast dissolving solid, and one part contains a slower dissolving solid).

Packaging System

In some embodiments, the solid composition can be packaged. The packaging receptacle or container may be rigid or flexible, and composed of any material suitable for containing the compositions produced according to the invention, as for example glass, metal, plastic film or sheet, cardboard, cardboard composites, paper, and the like.

Advantageously, since the composition is processed at or near ambient temperatures, the temperature of the processed mixture is low enough so that the mixture may be formed directly in the container or other packaging system without structurally damaging the material. As a result, a wider variety of materials may be used to manufacture the container than those used for compositions that processed and dispensed under molten conditions.

Suitable packaging used to contain the compositions is manufactured from a flexible, easy opening film material.

In some embodiments, a solid composition formed according to the methods of the present invention is packaged directly upon formation. That is, a solid composition is formed in the packaging from which it will be stored or dispensed. In some embodiments, the solid will be formed directly into a thin film plastic or a shrink wrapper. The solid may be formed in a packaging suitable for storage and/or dispensing of the solid.

Dispensing of the Processed Compositions

The cleaning composition made according to the present invention can be dispensed in any suitable method generally known. The cleaning composition can be dispensed from a spray-type dispenser such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. Briefly, a spray-type dispenser functions by impinging a water spray upon an exposed surface of the solid composition to dissolve a portion of the composition, and then immediately directing the concentrate solution including the composition out of the dispenser to a storage reservoir or directly to a point of use. When used, the product is removed from the package (e.g.) film and is inserted into the dispenser. The spray of water can be made by a nozzle in a shape that conforms to the solid shape. The dispenser enclosure can also closely fit the detergent shape in a dispensing system that prevents the introduction and dispensing of an incorrect detergent. The aqueous concentrate is generally directed to a use locus.

In some embodiments, the compositions hereof will be formulated such that during use in aqueous cleaning operations the wash water will have a pH of between about 1 and about 14, about 6.5 to about 11, or 7-10.5. Techniques for controlling pH at recommended usage levels include the use of buffers, alkali, acids, etc., and are well known to those skilled in the art.

In an embodiment, the present composition can be dispensed by immersing either intermittently or continuously in water. The composition can then dissolve, for example, at a controlled or predetermined rate. The rate can be effective to maintain a concentration of dissolved cleaning agent that is effective for cleaning.

In an embodiment, the present composition can be dispensed by scraping solid from the solid composition and contacting the scrapings with water. The scrapings can be added to water to provide a concentration of dissolved cleaning agent that is effective for cleaning.

Methods Employing the Present Compositions

It is contemplated that the cleaning compositions of the invention can be used in a broad variety of industrial, household, health care, vehicle care, and other such applications. Some examples include surface disinfectant, ware cleaning, laundry cleaning, laundry cleaning or sanitizing, vehicle cleaning, floor cleaning, surface cleaning, pre-soaks, clean in place, and a broad variety of other such applications.

The compositions can be applied in a variety of areas including kitchens, bathrooms, factories, hospitals, dental offices and food plants, and can be applied to a variety of hard surfaces having smooth, irregular or porous topography. A use concentration of a composition of the present invention can be applied to or brought into contact with an object by any conventional method or apparatus for applying a cleaning composition to an object. For example, the object can be wiped with, sprayed with, and/or immersed in the composition, or a use solution made from the composition. The composition can be sprayed, or wiped onto a surface; the composition can be caused to flow over the surface, or the surface can be dipped into the composition. Contacting can be manual or by machine.

Exemplary articles that can be treated, i.e., cleaned, with the use solution comprising a detersive composition and treated water include, but are not limited to motor vehicle exteriors, textiles, food contacting articles, clean-in-place (CIP) equipment, health care surfaces and hard surfaces. Exemplary motor vehicle exteriors include cars, trucks, trailers, buses, etc. that are commonly washed in commercial vehicle washing facilities. Exemplary textiles include, but are not limited to, those textiles that generally are considered within the term "laundry" and include clothes, towels, sheets, etc. In addition, textiles include curtains.

Exemplary food contacting articles include, but are not limited to, dishes, glasses, eating utensils, bowls, cooking articles, food storage articles, etc. Exemplary CIP equipment includes, but is not limited to, pipes, tanks, heat exchangers, valves, distribution circuits, pumps, etc. Exemplary health care surfaces include, but are not limited to, surfaces of medical or dental devices or instruments. Exemplary hard surfaces include, but are not limited to, floors, counters, glass, walls, etc. Hard surfaces can also include the inside of dish machines, and laundry machines. In general, hard surfaces can include those surfaces commonly referred to in the cleaning industry as environmental surfaces. Such hard surfaces can be made from a variety of materials including, for example, ceramic, metal, glass, wood or hard plastic.

The present invention can be better understood with reference to the following examples. These examples are intended to be representative of specific embodiments of the invention, and are not intended as limiting the scope of the invention.

EXAMPLES

Example 1—Making Pressed Solid Compositions

TABLE 1

Embodiments of Solid Cleaning Compositions of the Present Invention

| | wt-% | | | | | | |
|---|---|---|---|---|---|---|---|
| Ingredient | A | A1 | B | C | D | D1 | E |
| Carbonate Salt | 52 | 50-70 | 68 | 47 | 40 | 0-50 | 13 |
| Bicarbonate Salt | 2.9 | 2.9 | — | — | — | | — |
| Sequestrant | 32 | 5-25 | 6.7 | 5.6 | 49 | 33-80 | 2.0 |
| Surfactant | 4.6 | 4.6 | 3.7 | 3.7 | 3.6 | 3.6 | |
| Builder | 3.1 | 0.5-3.1 | 7 | 25 | — | — | 43 |
| Secondary Alkalinity Source | 3 | 3 | 4.4 | 3.7 | 7.7 | 7.7 | 3.0 |
| Coated Bleach | — | — | 3.3 | 8.5 | — | — | — |
| Water | | 0-34 | 2.2 | 2.2 | — | — | |
| Sodium Hydroxide | — | — | — | — | — | — | 37 |

As used in the table above, the compositions can include as sequestrants DTPA, HEDP, NTA, or the like; as builder citric acid, sodium polyacrylate, tripolyphosphate, or the like; as secondary alkalinity source sodium metasilicate, hydroxide salt, or the like. Each of compositions A-E were made as pressed solids. The ingredients were mixed for a sufficient time to mix the ingredients without excess drying. Suitable mixing times included about 5 (e.g., 4) to about 30 minutes.

Composition A, A1, D, D1, and E formed a pressed solid when mixed for 4, 15, and 30 minutes and pressed at 24, 59, 120, and 610 psi. The pressed solid was a 2, 4 or 6 lb block.

Compositions B and C formed a pressed solid when pressed at 24, 59, and 120 psi. The pressed solid was a 2, 4 or 6 lb block.

The compositions in the tables below can be made by the method of the present invention. For example, the flowable solid can be placed in a small cup (e.g., a specimen cup) and pressed gently by hand. After sitting several hours (e.g., overnight or 24 hours) the composition has cured to a stable solid composition.

TABLE 2

Embodiments of Solid Cleaning Compositions of the Present Invention

| | (wt-%) | | | | | | | | | | | | |
|---|---|---|---|---|---|---|---|---|---|---|---|---|---|
| Ingredient | F | G | H | I | J | K | L | M | N | O | P | Q | R |
| Carbonate | 53 | 63-67 | 42-53 | 51 | 56-57 | 53-59 | 55-57 | 54 | 14 or 9 | 30 | 25 | 40 | 52 |
| biodegradable amino carboxylate | 10 | 10 | 10 | 26* | 20 | 5-16 | 0-10 | 0-10 | | 30 | | 43 | 20* |
| citrate | 14-25 | 10 | 10 | 2 | | 20 | 13-23 | 13-23 | | | | | 2 |
| Hydroxide salt | | | 2 | | 0-1 | | | 1 | 37 | 18 | | | |
| polymer polycarboxylate | 1 | 2-4 | 4-5 | 1 | 7-9 | 1 | 1 | 1 | 4 | | | | |
| Sulfonated polymer | | | | | | | 6-12 | 7-13 | | | | | |
| phosphonate | | | | | | | | | 5 | | 10 | 13 | |
| Water | 8 | | 4 | | 3-4 | 0-10 | 4 | | | | | | |
| secondary alkalinity | 3 | 3 | | 3-4 | 3 | 3 | 3 | 3 | 1 | 20 | 10 | | 3 |
| tripolyphosphate | | | | | | | | | 40 | | 50 | | |
| polyol | | | | | | | | | | | 4 | 4 | |
| Surfactant | 5 | 3 | 3-5 | 5 | 5 | 3-5 | 5 | 5 | | | | | |

| | (wt-%) | | | | | | | | |
|---|---|---|---|---|---|---|---|---|---|
| Ingredient | S | T | U | V | W | X | Y | Z | AA |
| Carbonate | 67 | 46 | | 66 | 13 | 9 | 30 | 25 | 40 |
| biodegradable amino carboxylate | | | | 12 | | | 30 | | 43 |
| phosphonate | 7 | 6 | | | | | | | |
| gluconate | | | 50 | | | | | | |
| Hydroxide salt | 10* | 8* | 25 | | 37 | 37 | 18 | | |
| polymer polycarboxylate | | | 5 | 5 | 2 | 2 | | | |
| phosphonate | | | | | 5 | 5 | | 10 | 13 |
| Water | | 2 | 2 | 0-10 | | | | | |
| secondary alkalinity | 3 | | | 0-20 | 1 | 1 | 20 | 10 | |
| tripolyphosphate | | 7 | 25 | | 40 | 40 | | 50 | |
| Surfactant | | 3.5 | 3.5 | | | | 4 | 4 | |

Example 2—Making Pressed Solid Compositions with a Concrete Block Machine

In this example, stable solid block compositions were made by gentle pressing and/or vibrating using a concrete block machine.

A self-solidifying carbonate-based cleaning composition was subjected to pressing and vibration in a Besser Vibrapac concrete block machine. The ingredients for the composition were mixed in 1000 lb batches. Standard pallets of forms (e.g., shoes) for making concrete pavers were employed. Each pallet included forms for 10 pavers. A total of 92 pallets were filled with mixed ingredients under various conditions, including those employed to set up the machine for working with a self-solidifying carbonate-based composition rather than concrete.

The machine was operated with vibration for feeding the composition and, optionally, finishing the block. Feed vibration refers to vibration while filling the drawer, which is then moved over the pallet of forms to fill the forms. Finishing vibration refers to vibration while the shoes press the flowable solid into the mold cavities. Feed vibration was at 2800 rpm and an amplitude of 1000 (the maximum). Finishing vibration was at 3000 rpm and an amplitude of 1000 when used. Stable solid blocks were formed with and without finishing vibration. The flowable solid was pressed in the molds with a total weight/pressure/force of about 100 lbs. The forms (e.g., shoes) were not heated or were heated to 115 to 150° F. during vibrating and/or pressing. A block was determined to be suitable if, when pushed out of the form, the block retained its shape.

After the settings for the machine were set for making blocks of the self-solidifying carbonate-based composition, 910 blocks were made with only 32 blocks that did not solidify to form a stable solid block. Nearly all of these blocks weighed 4.2 to 5.1 pounds, a few weighed as little as 4.1 pounds or up to nearly 5.2 pounds.

Example 3—Pressed Solid Compositions are Dimensionally Stable

The experiments detailed below demonstrate that the solid compositions according to the present invention were dimensionally stable.

Materials and Methods

Compositions AB, AC, and AD (Table 3) were compositions of the present invention including a straight chain saturated mono-, di-, or tri-carboxylic acid salt in the binding agent. Compositions AE, AF, AG, AH, AI, and AJ (Table 3) were compositions of the present invention including an aminocarboxylate in the binding agent. Compositions AK, AL, and AM (Table 3) were compositions of the present invention including a polycarboxylate in the binding agent.

The ingredients except the straight chain saturated mono-, di-, or tri-carboxylic acid salt, the amino carboxylate, or polycarboxylate were premixed to form a powder premix. The straight chain saturated mono-, di-, or tri-carboxylic acid salt, the amino carboxylate, or polycarboxylate and water were premixed to form a liquid premix. The powder premix and the liquid premix were then mixed together to form the flowable solid and subjected to gentle pressing as described above. For compositions AK and AM, the liquid premix included the sodium hydroxide.

Control composition CA (Table 3) was similarly prepared as a control lacking the mono-, di-, or tri-carboxylic acid salts, the aminocarboxylates, and the polycarboxylates.

Ingredients in the compositions tested included Versene HEIDA, 52%: a $Na_2EDG$, disodium ethanoldiglycine, available from Dow Chemical, Midland, MI. Trilon M, 40%: a trisodium methylgylcinediacetic acid trisodium salt solution, available from BASF Corporation, Charlotte, NC. IDS: an iminodisuccinic acid sodium salt solution, available from Lanxess, Leverkusen, Germany. DissolvineGL-38, 38%: a GLDA-$Na_4$, tetrasodium N,N-bis(carboxylatomethyl)-L-glutamate, available from Akzo Nobel, Tarrytown, NJ. Octaquest, 37%: a EDDS, [S—S]-ethylenediaminedisuccinic acid; and tetrasodium 3-hydroxy-2,2'-iminodisuccinate, available from Innospec Performance Chemicals (Octel Performance Chemicals), Edison, NJ. HIDS, 50%: a tetrasodium 3-hydroxy-2,2'-iminodisuccinate, available from Nippon Shokubai, Osaka, Japan.

Dimensional Stability Test for Gently Pressed Solid Cleaning Compositions

A batch of solid cleaning composition according to the present invention weighing about 50 grams was made by gentle pressing and including in the binding agent a straight chain saturated mono-, di-, or tri-carboxylic acid salt, an aminocarboxylate, or a polycarboxylic acid polymer. Each batch of solid cleaning composition was made by pressing the flowable solid in a die at a gauge pressure of about 1000 psi (about 425 psi on the solid in the form) for about 20 seconds to form a puck of the solid cleaning composition. The diameter and height of the solids were measured and recorded. The pucks were maintained at room temperature for one day and then placed in an oven at a temperature of about 120° F. After the pucks were removed from the oven, their diameters and heights were measured and recorded. They were considered to exhibit dimensional stability if there was less than about 2% swelling, or growth.

TABLE 3

Embodiments of Solid Cleaning Compositions of the Present Invention

| Ingredient | (wt-%) AB | AC | AD | | AE | AF | AG | AH | AI | AJ | | AK | AL | AM | CA |
|---|---|---|---|---|---|---|---|---|---|---|---|---|---|---|---|
| Sodium carbonate | 55 | 55 | 52 | | 54 | 55 | 57 | 59 | 53 | 53 | | 56 | 57 | 57 | 57 |
| Sodium bicarbonate | 3 | 3 | 3 | | 3 | 3 | 3 | 3 | 3 | 3 | | 3 | 3 | 3 | 3 |
| Anhydrous sodium metasilicate | 3 | 3 | 3 | | 3 | 3 | 3 | 3 | 3 | 3 | | 3 | 3 | 3 | 3 |
| Builder | 20 | 20 | 20 | | 20 | 20 | 20 | 20 | 20 | 20 | | 20 | 20 | 20 | 20 |
| polymer polycarboxylate | 1 | 1 | 1 | | 1 | 1 | 1 | 1 | 1 | 1 | Hydroxide Salt | 1.3 | | 1.3 | 1 |
| Nonionic surfactant | 3.5 | 3.5 | 3.5 | | 3.5 | 2 | 2 | 3.5 | 3.5 | 3.5 | | 3.5 | 3.5 | 3.5 | 3.5 |
| Defoamer | 1 | 1 | 1 | | 1 | 1 | 1 | 1 | 1 | 1 | | 1 | 1 | 1 | 1 |
| Water | 8.8 | 13 | 7.6 | | | 9.5 | 8.5 | | | | | 3.8 | 3.8 | 2.8 | 11 |
| Sodium citrate dihydrate | 5.2 | | | HEIDA | 7.8 | | | | | | Polyacrylic acid | 7.3 | | | |
| Sodium tartrate dihydrate | | 1.4 | | MGDA | | 2.2 | | | | | Modified polyacrylic acid | | 9 | | |
| Sodium acetate | | | 9.4 | IDS | | | 5 | | | | Polymaleic acid | | | 7.1 | |
| | | | | GLDA | | | | 3.8 | | | | | | | |
| | | | | EDDS | | | | | 5.9 | | | | | | |
| | | | | HIDS | | | | | | 8 | | | | | |

| Ingredient | (wt-%) AN | AO | AP | AQ | AR | AS | AT | AU | AV |
|---|---|---|---|---|---|---|---|---|---|
| Sodium carbonate | 56 | 57 | 56 | 54 | 54 | 54 | 54 | 52 | 55 |
| Sodium bicarbonate | 3 | 3 | 3 | 3 | 3 | 3 | 3 | 3 | 3 |

TABLE 3-continued

| Embodiments of Solid Cleaning Compositions of the Present Invention | | | | | | | | | |
|---|---|---|---|---|---|---|---|---|---|
| Anhydrous sodium metasilicate | 3 | 3 | 3 | 3 | 3 | 3 | 3 | 3 | 3 |
| Sodium Citrate | 10 | 20 | 20 | 10 | 10 | 13 | 10 | 20 | 20 |
| iminodisuccinate | 10 | | | | | | | | |
| polymer polycarboxylate | 1 | 1 | 1 | 1 | 1 | 1 | 1 | 1 | 1 |
| Nonionic surfactant | 3.5 | 3.5 | 3.5 | 3.5 | 3.5 | 3.5 | 3.5 | 3.5 | 3.5 |
| Defoamer | 1 | 1 | 1 | 1 | 1 | 1 | 1 | 1 | 1 |
| Water | 4.3 | | 4.3 | 1 | | 4.3 | | | |
| Hydroxide Salt | | | | 1.3 | 1.4 | 0.7 | 1.3 | | |
| Carboxylate/sulfonate copolymer | 6 | 12 | 6 | | 7.8 | | | | |
| Carboxylate/sulfonate terpolymer | | | | | | 2.2 | | | 2 |
| Polymethacrylate | | | | | | | | 4.9 | 3.6 |

Results

The results of the testing of dimensional stability for solid compositions of the present invention and control compositions are reported in Table 4 below. A negative percent increase in size represents a decrease in size.

The compositions of the present invention are dimensionally stable with increases in size that are significantly less than 2%, with most increases less than 1%. The control composition is not and increased in size by 2.7% and 8.2% in diameter and height, respectively. This indicates that the binding agent of the present composition participates in providing dimensional stability to the present gently pressed solid cleaning compositions.

TABLE 4

Results of dimensional stability testing for solid compositions of the invention.

| Composition | | Initial (mm) | After Heating (mm) | % Increase |
|---|---|---|---|---|
| AB | Diameter | 45.17 | 45.33 | 0.3 |
| | Height | 19.15 | 19.17 | 0.1 |
| AC | Diameter | 44.69 | 44.86 | 0.4 |
| | Height | 21.03 | 21.07 | 0.1 |
| AD | Diameter | 45.38 | 45.46 | 0.1 |
| | Height | 20 | 20.08 | 0.4 |
| AE | Diameter | 45.51 | 45.82 | 0.7 |
| | Height | 19.14 | 19.4 | 1.4 |
| AF | Diameter | 44.77 | 45.08 | 0.7 |
| | Height | 19.37 | 19.61 | 1.2 |
| AG | Diameter | 44.75 | 44.75 | 0 |
| | Height | 19.87 | 19.89 | 0.1 |
| AH | Diameter | 44.7 | 44.76 | 0.1 |
| | Height | 19.87 | 20.02 | 0.7 |
| AI | Diameter | 44.69 | 44.96 | 0.6 |
| | Height | 19.24 | 19.08 | −0.8 |
| AJ | Diameter | 44.94 | 45.08 | 0.3 |
| | Height | 19.74 | 19.99 | 1.3 |
| AK | Diameter | 44.69 | 44.96 | 0.6 |
| | Height | 20.64 | 20.87 | 1.1 |
| AL | Diameter | 44.69 | 44.71 | 0 |
| | Height | 19.76 | 19.64 | −0.6 |
| AM | Diameter | 45.03 | 45.44 | 0.9 |
| | Height | 19.66 | 19.89 | 1.2 |
| AN | Diameter | 44.69 | 44.99 | 0.7 |
| | Height | 18.7 | 19 | 1.6 |
| AO | Diameter | 44.81 | 45.2 | 0.9 |
| | Height | 19.21 | 19.48 | 1.4 |
| AP | Diameter | 44.67 | 45.2 | 1.2 |
| | Height | 19.68 | 19.93 | 1.3 |

TABLE 4-continued

Results of dimensional stability testing for solid compositions of the invention.

| Composition | | Initial (mm) | After Heating (mm) | % Increase |
|---|---|---|---|---|
| AQ | Diameter | 44.81 | 45 | 0.4 |
| | Height | 19.58 | 19.78 | 1.0 |
| AR | Diameter | 44.90 | 45.01 | 0.2 |
| | Height | 19.48 | 19.58 | 0.5 |
| AS | Diameter | 44.76 | 44.92 | 0.3 |
| | Height | 17.35 | 17.32 | 0.2 |
| AT | Diameter | 44.93 | 45.08 | 0.3 |
| | Height | 19.24 | 19.35 | 0.6 |
| AU | Diameter | 44.81 | 44.79 | 0 |
| | Height | 19.15 | 19.17 | 0.1 |
| AV | Diameter | 44.82 | 44.87 | 0.1 |
| | Height | 19.40 | 19.37 | 0.1 |
| CA (control) | Diameter | 44.77 | 46 | 2.7 |
| | Height | 19.38 | 20.96 | 8.2 |

Example 4—Dimensional Stability of Pressed Solid Compositions

A study was performed to examine the dimensional stability of various self-solidifying compositions. The following compositions were tested.

TABLE 5

| | Formulation | | | |
|---|---|---|---|---|
| Ingredient | 1 | 2 | 3 | 4 |
| Anhydrous sodium metasilicate | 10.0 | 10.0 | 10.0 | 10.0 |
| Sodium carbonate | 25.0 | 0.0 | 25.0 | 0.0 |
| Tri-Carboxylic acid | 0.9 | 0.9 | 0 | 0 |
| Biodegradable Aminocarboxylate | 17.1 | 17.1 | 17.1 | 17.1 |
| polycarboxylate | 12.0 | 12.0 | 12.0 | 12.0 |
| Dense Ash | 0 | 25.0 | 0 | 25.0 |
| Sodium Citrate Dihydrate | 0 | 0 | .9 | .9 |
| Caustic Beads | 20.0 | 20.0 | 20.0 | 20.0 |
| Wasserglass 37/40 | 15.0 | 15.0 | 15.0 | 15.0 |

To form the compositions, the metasilicate, ash, polycarboxylate, and the sodium citrate dehydrate or tri-carboxylic acid (whichever was present) were added. The wasserglass was then added, followed by the caustic bead and the biodegradable aminocarboxylate. Upon mixing the composition was soft and easily broken. The compositions were then pressed to form stable solids.

The dimensional stability of the solids was measured initially. The solids were then stored either at: ambient temperature, 100° F., or 122° F. for one week. After one week, the dimensional stability of the solids was measured. They were considered to exhibit dimensional stability if there was less than about 2% swelling, or growth. The table below shows the results of this study shown in units of fractional growth.

TABLE 6

| Formulation | Amb | 100 F. | 122 F. | Grand Total |
|---|---|---|---|---|
| 1 | 0.007327341 | 0.020933001 | 0.02739502 | 0.017429343 |
| 2 | 0.00519962 | 0.012232839 | 0.02864424 | 0.014342972 |
| 3 | 0.004761412 | 0.021945528 | 0.036008087 | 0.019290649 |
| 4 | 0.002183471 | 0.021104529 | 0.035326006 | 0.017802549 |
| Total | 0.004867961 | 0.019053974 | 0.031843338 | 0.017216378 |

Figure 3:
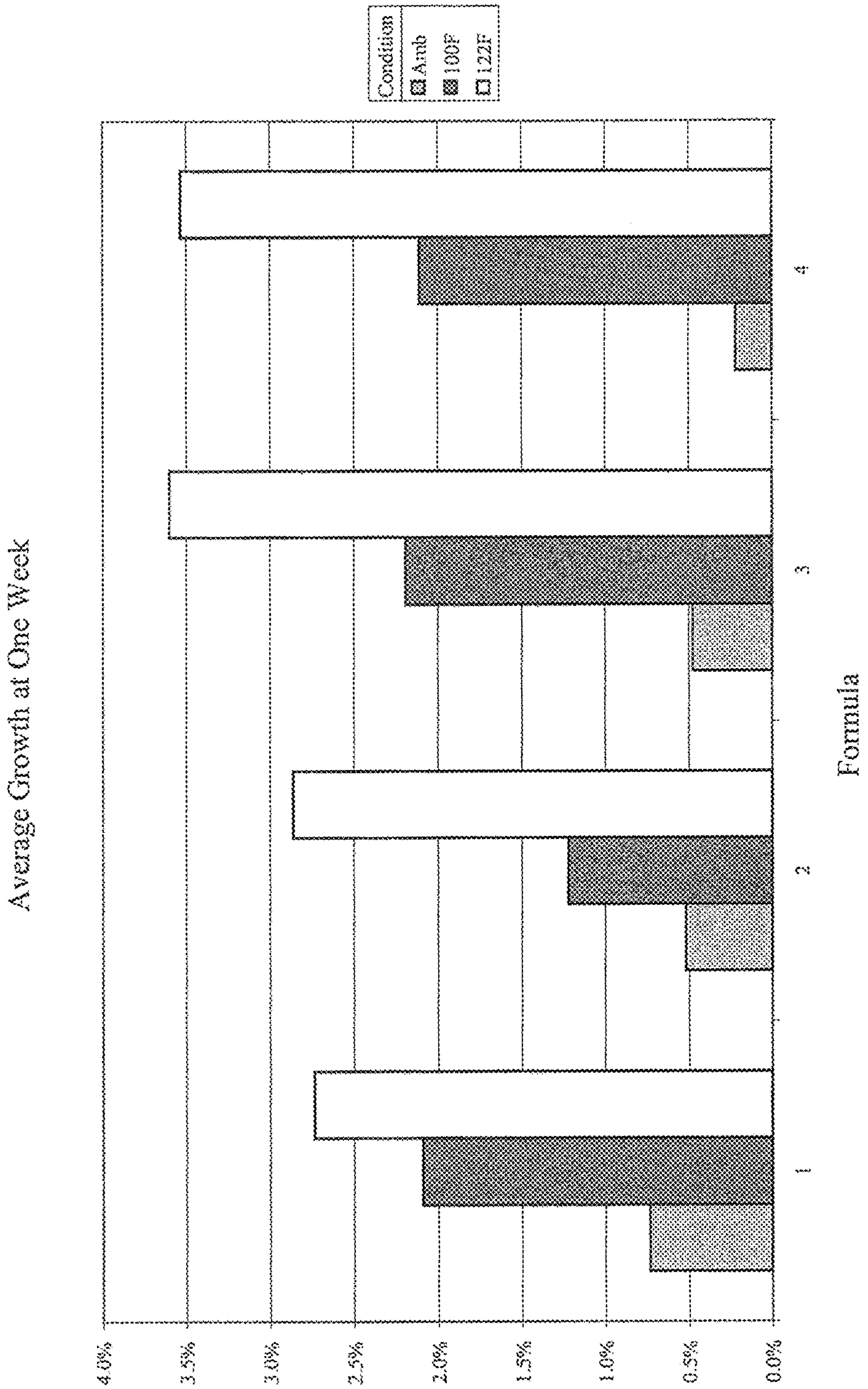
FIG. 3 is a graphical depiction of the average growth at one week of various compositions prepared by the methods of the present invention when stored at various temperatures.

These results are also graphically depicted in FIG. 3 as percent growth. As can be seen from these results, the blocks exhibited dimensional stability at one week when stored at ambient temperatures. Formulations 1 and 2 exhibited the greatest dimensional stability at elevated temperatures.

Another experiment was run removing the dense ash and increasing the amount of the caustic beads. The following formulations were tested.

TABLE 7

| | Formulation | | | |
|---|---|---|---|---|
| Ingredient | 5 | 6 | 7 | 8 |
| Anhydrous sodium metasilicate | 10.0 | 10.0 | 10.0 | 10.0 |
| Sodium carbonate | 25.0 | 25.0 | 12.5 | 30.0 |
| Tri-Carboxylic acid | 0.9 | 0.9 | 0.9 | 0.90 |
| Biodegradable Aminocarboxylate | 17.1 | 17.1 | 17.1 | 17.1 |
| polycarboxylate | 12.0 | 12.0 | 12.0 | 12.0 |
| Dense Ash | 0 | 0 | 0 | 0 |
| Sodium Citrate Dihydrate | 0 | 0 | 0 | .0 |
| Caustic Beads | 20.0 | 25.0 | 37.50 | 15.0 |
| Wasserglass 37/40 | 15.0 | 10.0 | 10.0 | 15.0 |

Figure 4:
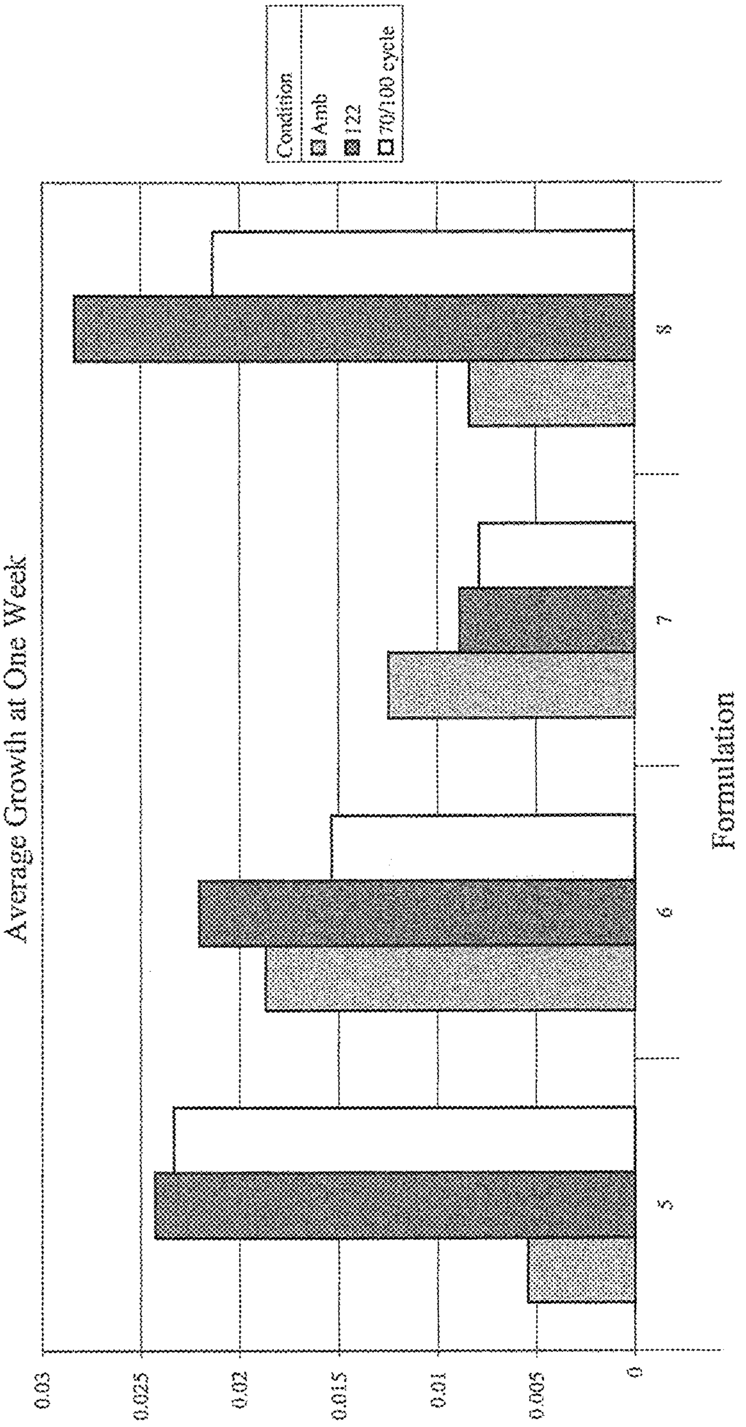
FIG. 4 is a graphical depiction of the average growth at one week of various compositions prepared by the methods of the present invention when stored at various temperatures.

The compositions were pressed at 500 psig, and the average growth was measured at one week. The compositions were stored for one week at either ambient temperature, 122° F., or at a cycle of 70° F./100° F. The results are shown in FIG. 4. As can be seen from these results, the compositions had less growth when stored at ambient temperatures, but still exhibited dimensional stability at increased temperatures.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

The invention has been described with reference to various specific and preferred embodiments and techniques. However, it should be understood that many variations and modifications may be made while remaining within the spirit and scope of the invention.

What is claimed is:

1. A flowable self-solidifying solid cleaning composition comprising:

up to about 15 wt-% water;

about 50 wt-% to about 70 wt-% sodium carbonate;

about 1 wt-% to about 5 wt-% sodium bicarbonate;

about 10 wt-% to about 30 wt-% sequestrant, wherein the sequestrant comprises a polymeric polycarboxylate;

about 0.1 wt-% to about 5 wt-% methylglycinediacetic acid or salt thereof; and about 1 wt-% to about 5 wt-% sodium metasilicate;

wherein the solid cleaning composition is a flowable self-solidifying solid, wherein the composition comprises less than about 0.5% phosphorous-containing compounds, and wherein the composition is free of nitrilotriacetic acid and free of an active oxygen compound.

2. The composition of claim 1, comprising from about 2 wt-% up to about 15 wt-% water.

3. The composition of claim 1, further comprising additional cleaning agents.

4. The composition of claim 3, wherein the cleaning agent is a surfactant in the amount from about 0.5 wt-% to about 10 wt-% surfactant.

5. The composition of claim 1, further comprising a binding agent that is comprised of stearic monoethanolamide, lauric diethanolamide, an alkylamide, a solid polyethylene glycol, a solid EO/PO block copolymer, water insoluble starches or combinations thereof.

6. The composition of claim 1, further comprising a hydrated carboxylate.

7. The composition of claim 6, wherein the hydrated carboxylate comprises a salt of a 1-12 carbon carboxylic acid comprising 1-3 carboxyl moieties.

8. The composition of claim 7, wherein the carboxylate comprises a salt of acetic acid, gluconic acid, malic acid, succinic acid, glutaric acid, adipic acid, tartaric acid, citric acid, or mixture thereof.

9. The composition of claim 7, wherein the hydrated carboxylate comprises a salt of acetic acid, tartaric acid, citric acid, or mixture thereof.

10. The composition of claim 1, wherein the solid composition is dimensionally stable as measured by an expansion of less than about 3% in any dimension when heated to 122° F. for one week.

11. A flowable self-solidifying cleaning composition comprising:

up to about 15 wt-% water;

about 50 wt-% to about 70 wt-% sodium carbonate;

about 1 wt-% to about 5 wt-% sodium bicarbonate about 10 wt-% to about 30 wt-% sequestrant, wherein the sequestrant comprises a polymeric polycarboxylate;

about 0.1 wt-% to about 5 wt-% methylglycinediacetic acid or salt thereof; and about 1 wt-% to about 5 wt-% sodium metasilicate;

wherein the solid cleaning composition is a flowable self-solidifying solid, and wherein the composition comprises less than about 0.5 wt-% phosphorous-containing compounds and less than about 0.5 wt-% nitrilotriacetic acid and is free of an active oxygen compound.

* * * * *